HIGH SPEED PRINTER

Filed June 13, 1955 11 Sheets-Sheet 1

INVENTOR.
MARVIN JACOBY
By Charles C. English
AGENT

INVENTOR.
MARVIN JACOBY
By Charles C. Englund
AGENT

INVENTOR.
MARVIN JACOBY
BY Charles C. English
AGENT

Dec. 8, 1959 M. JACOBY 2,915,966

HIGH SPEED PRINTER

Filed June 13, 1955 11 Sheets-Sheet 4

INVENTOR.
MARVIN JACOBY

BY Charles C. Enfield
AGENT

INVENTOR.
MARVIN JACOBY
BY Charles C. English
AGENT

INVENTOR.
MARVIN JACOBY
BY Charles E. Engish
AGENT

HIGH SPEED PRINTER

Filed June 13, 1955 11 Sheets-Sheet 7

INVENTOR.
MARVIN JACOBY

BY Charles C. English
AGENT

INVENTOR.
MARVIN JACOBY
BY Charles C. English
AGENT

INVENTOR.
MARVIN JACOBY
BY Charles C. English
AGENT

Dec. 8, 1959 M. JACOBY 2,915,966

HIGH SPEED PRINTER

Filed June 13, 1955 11 Sheets-Sheet 10

INVENTOR.
MARVIN JACOBY

BY Charles C. English
AGENT

HIGH SPEED PRINTER

Filed June 13, 1955 11 Sheets-Sheet 11

INVENTOR.
MARVIN JACOBY

BY Charles C. English
AGENT 2,915,966
Patented Dec. 8, 1959

2,915,966

HIGH SPEED PRINTER

Marvin Jacoby, Norristown, Pa., assignor to Sperry Rand Corporation, Philadelphia, Pa., a corporation of Delaware Application June 13, 1955, Serial No. 514,852

33 Claims. (Cl. 101—93)

Figure 1:
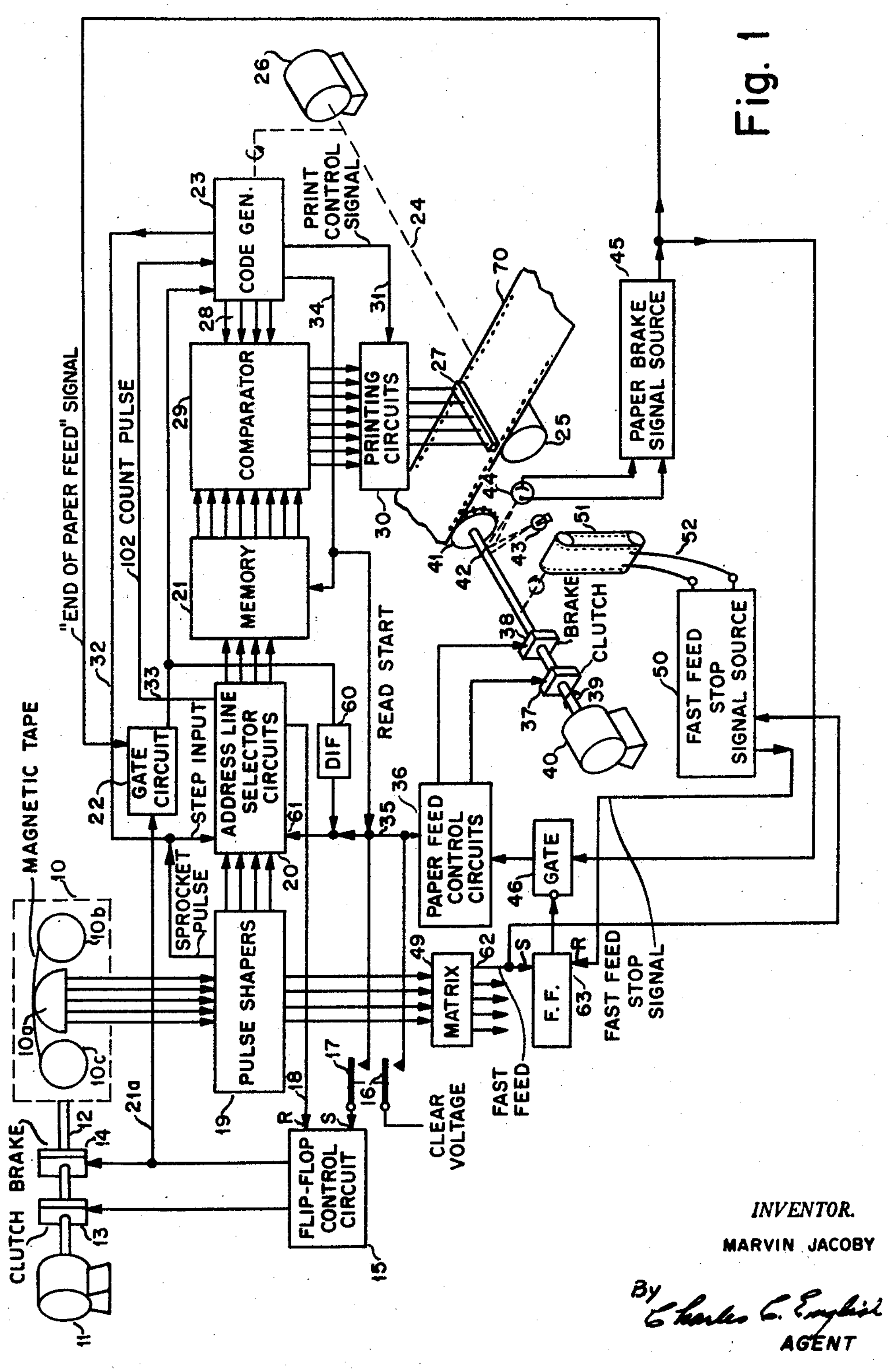

This invention relates in general to high speed printers of the rotating typewheel class, and in particular this invention is an improvement over the printer disclosed in the copending application of Eckert and Masterson, Serial No. 486,206, filed February 4, 1955, and assigned to the same assignee as the present application.

As will be brought out more fully hereinafter, the present invention utilizes a continuously rotating typewheel, or cylinder, which contains a plurality of identical, peripheral rows of type characters arranged so that the corresponding characters in each successive row of type are (generally speaking) essentially axially aligned over the length of the wheel. The intelligence to be printed is represented by a binary coded signal, such as that obtained from various electronic computers, which is stored in an electronic memory circuit. This storage is done in such a manner that each alphabetic, numeric, or other special character to be printed in one or sometimes more complete lines of type is stored at a different location in the memory circuit. Each of these memory locations controls the actuation of a print hammer associated with a different row of type on the wheel. Ganged to the typewheel and operated synchronously therewith is a code generator which generates a binary code representative of the particular type character instantaneously under the print hammers. The code generated by the code generator is compared with the code stored in the several locations of the memory circuit. When the code generated by the generator corresponds with that stored in any one or more of the several memory locations, the print hammers under control of these locations are actuated and the characters to which this code corresponds are caused to be imprinted on the paper. After one complete revolution of the typewheel, one complete horizontal line is printed, and the memory must be cleared and refilled with new information for the next horizontal line.

It is an object of this invention to provide a novel, fully automatic high speed printer.

It is another object of this invention to provide a high speed printer which is capable of producing many varied printing formats.

It is another object of this invention to provide an electronically controlled printer for converting coded information stored on magnetic tape or the like into printed form.

It is another object of this invention to provide a high speed printer of the foregoing class wherein the printing paper is advanced during the interval that coded information is being fed into the memory circuit.

It is another object of the present invention to provide a novel high speed printer of the foregoing class wherein the printing paper may be fast fed to predetermined locations during the interval that coded information is being fed into the memory circuit.

Another object of this invention is to provide a fully automatic high speed printer of the foregoing class which is particularly adapted to be used with electronic computers utilizing binary coded signals.

Figure 2A:
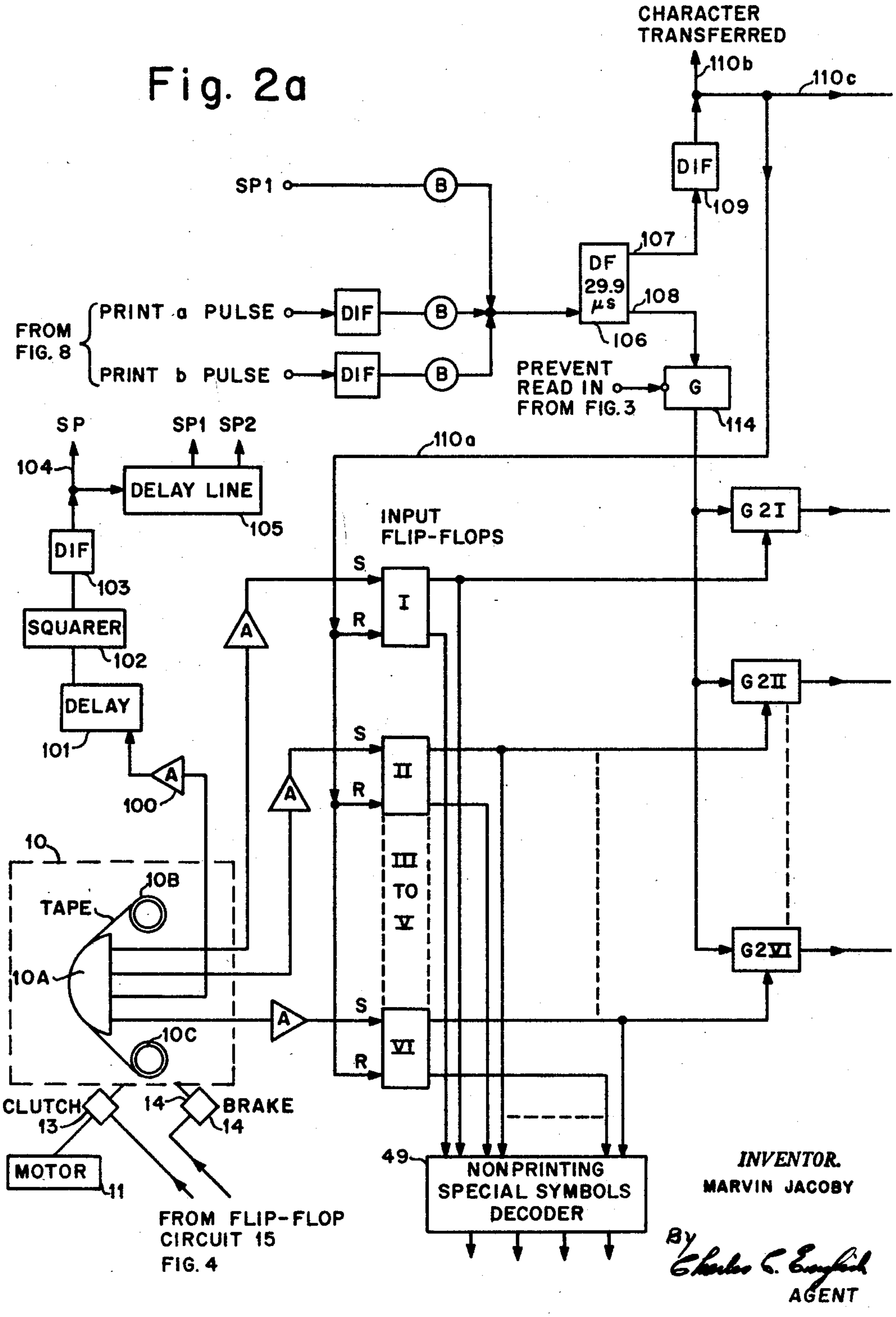
Figure 2B:
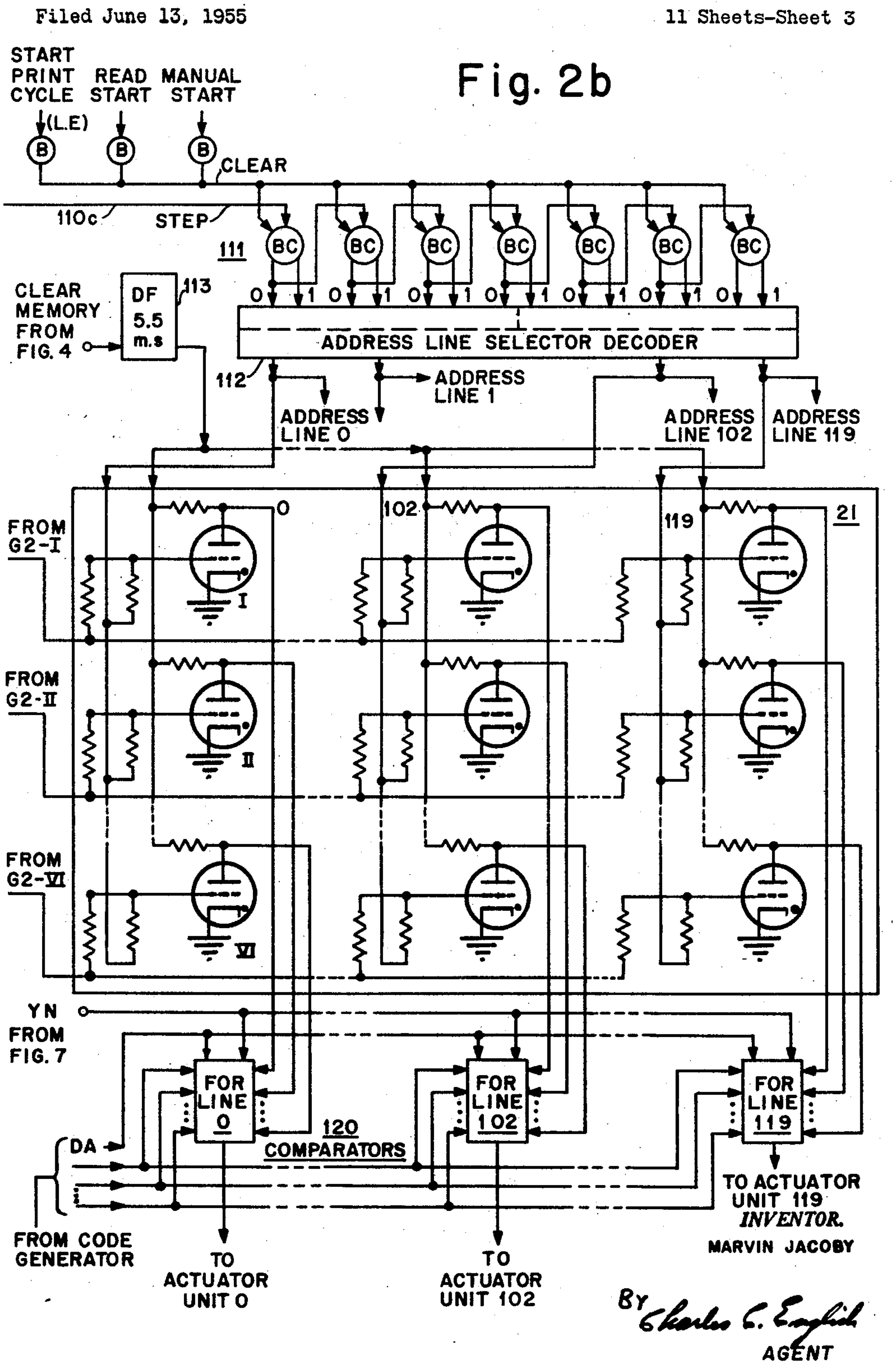
Figure 3:
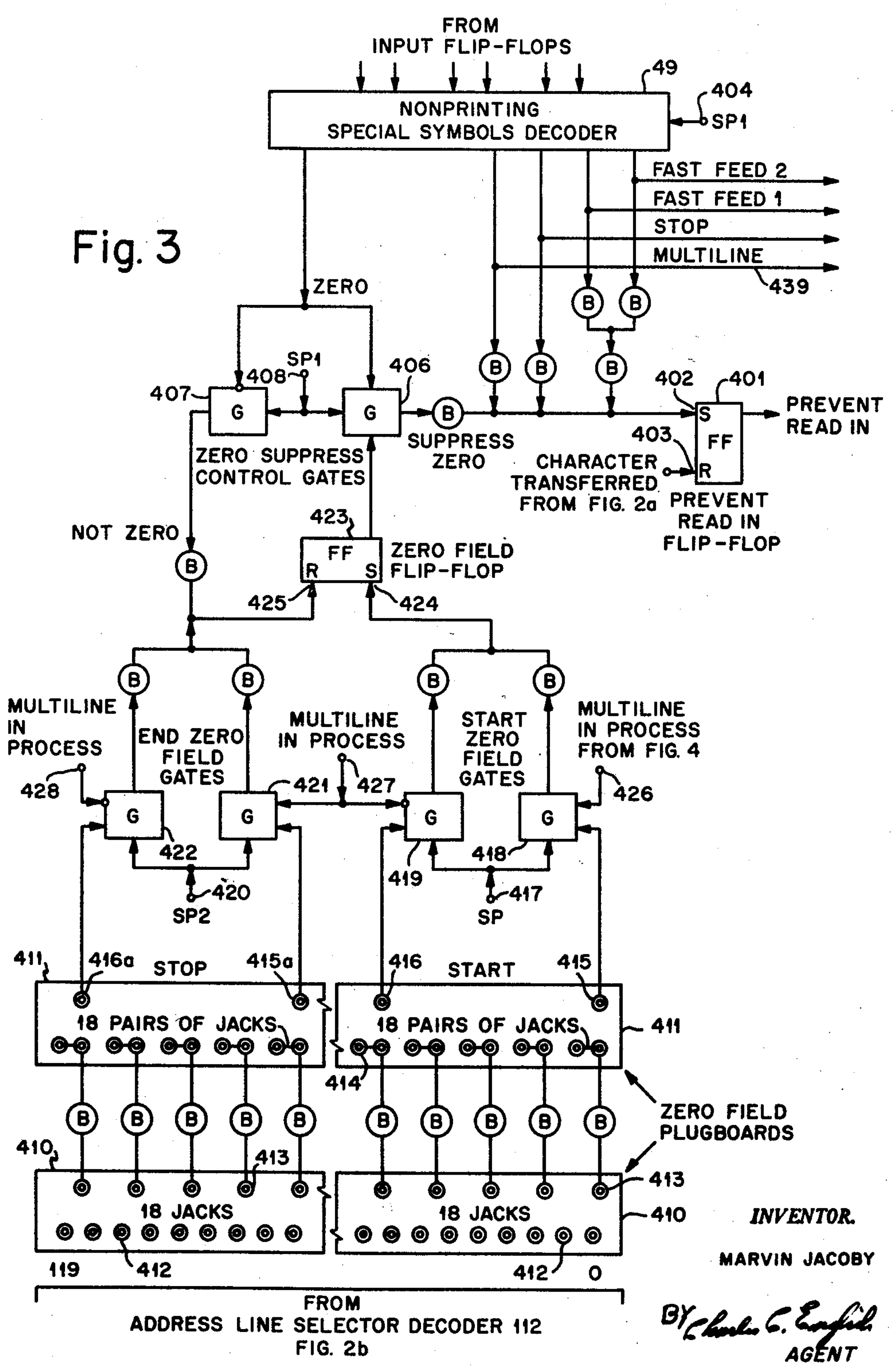
Figure 4:
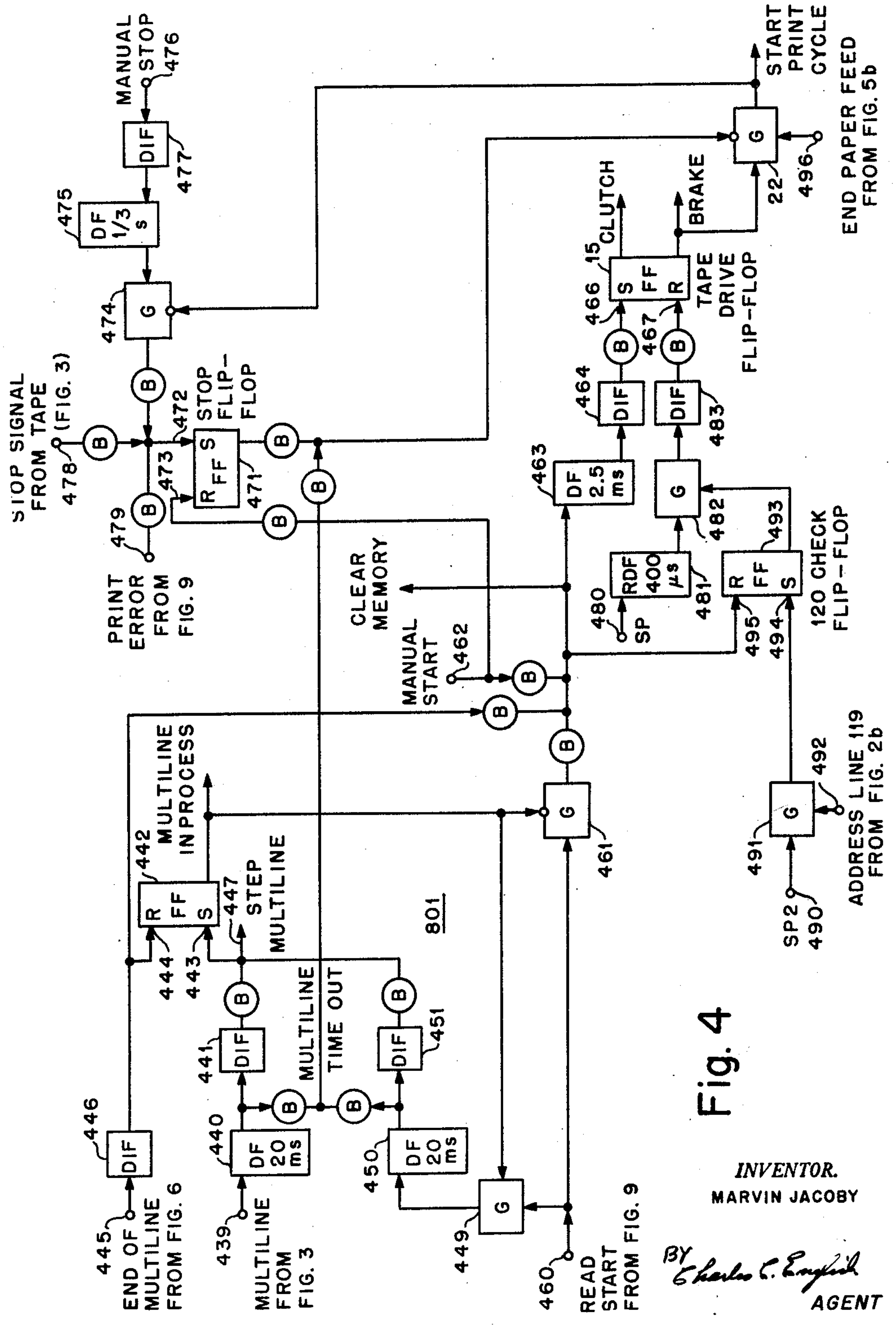
Figure 5A:
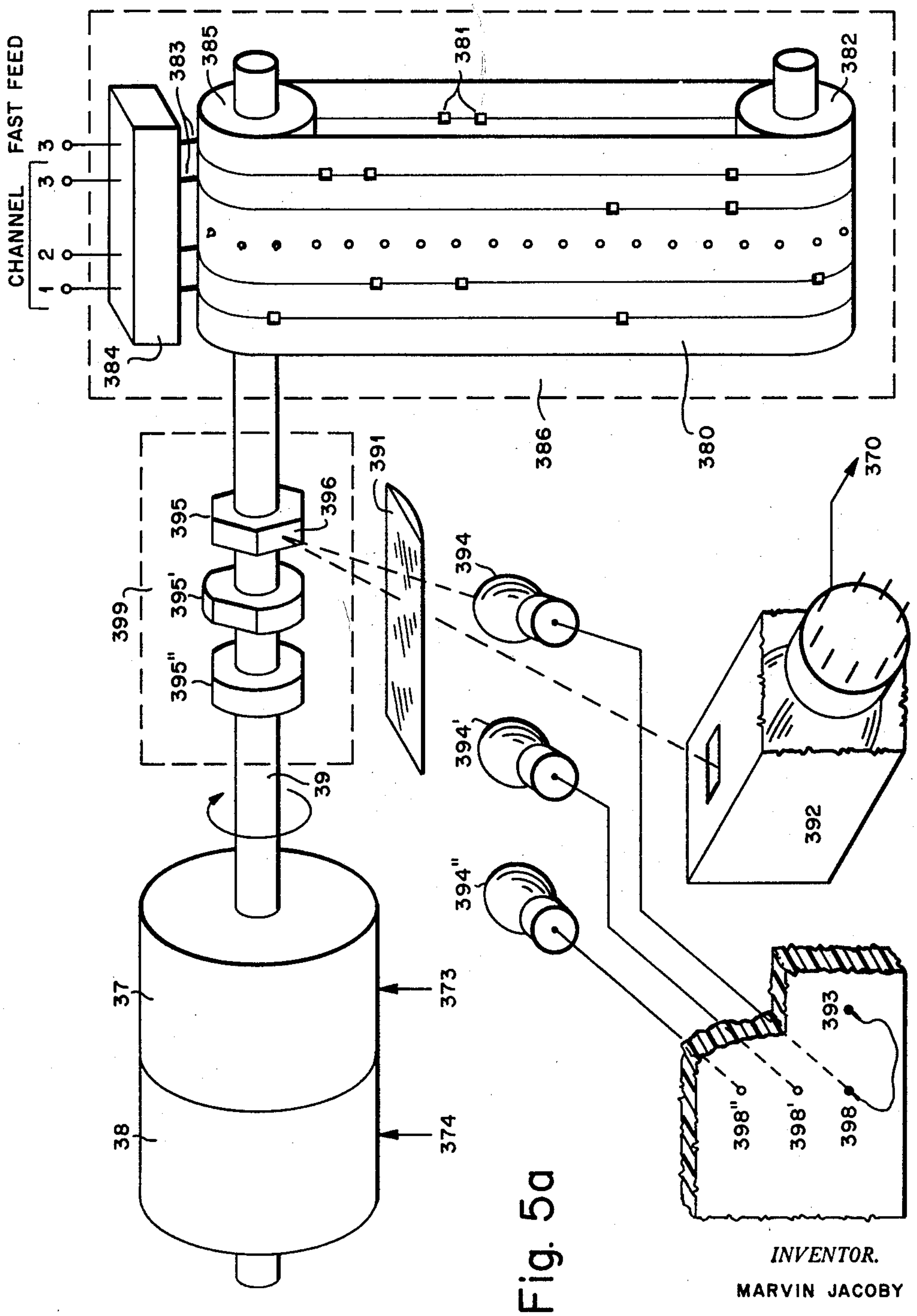
Figure 5B:
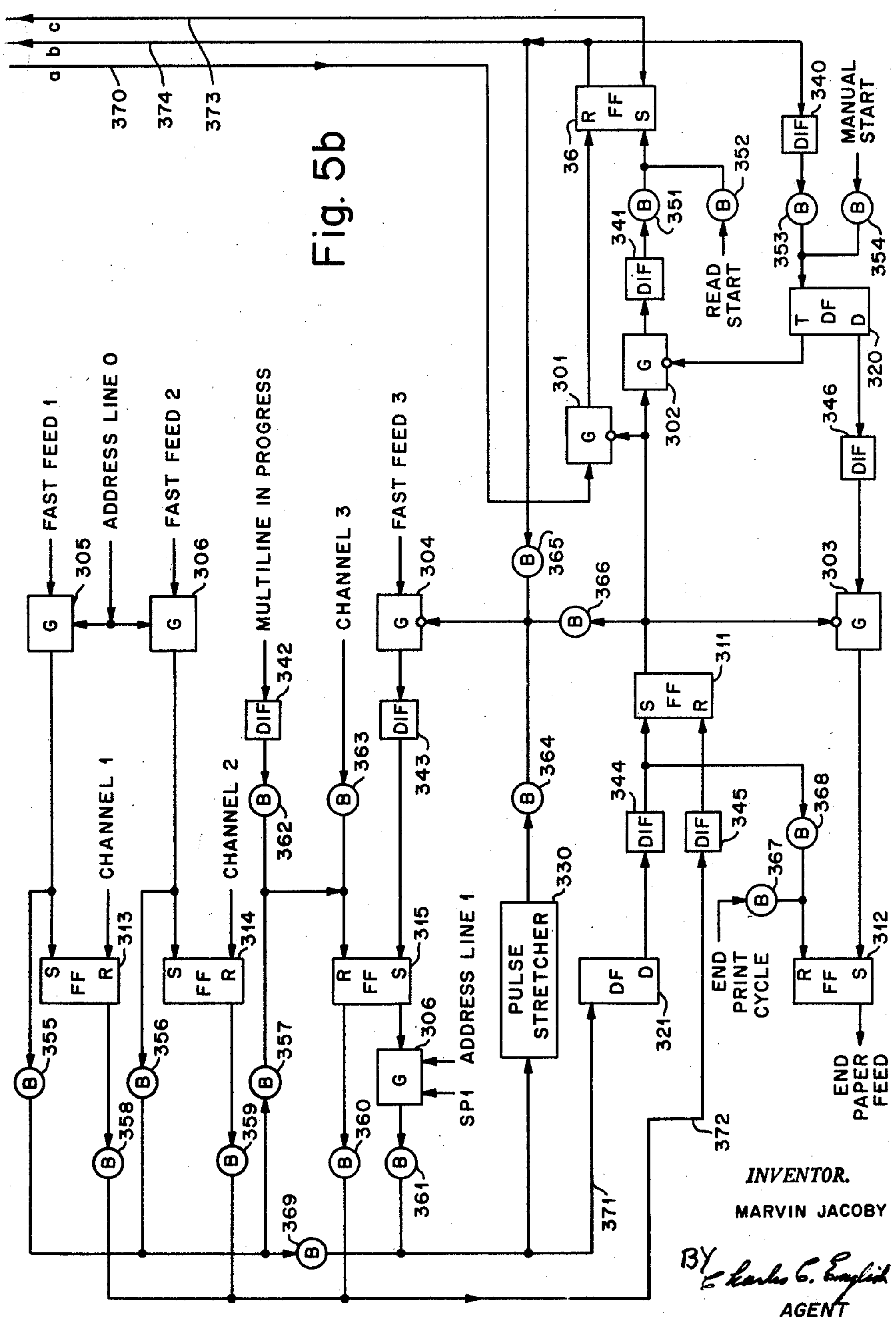
Figure 6:
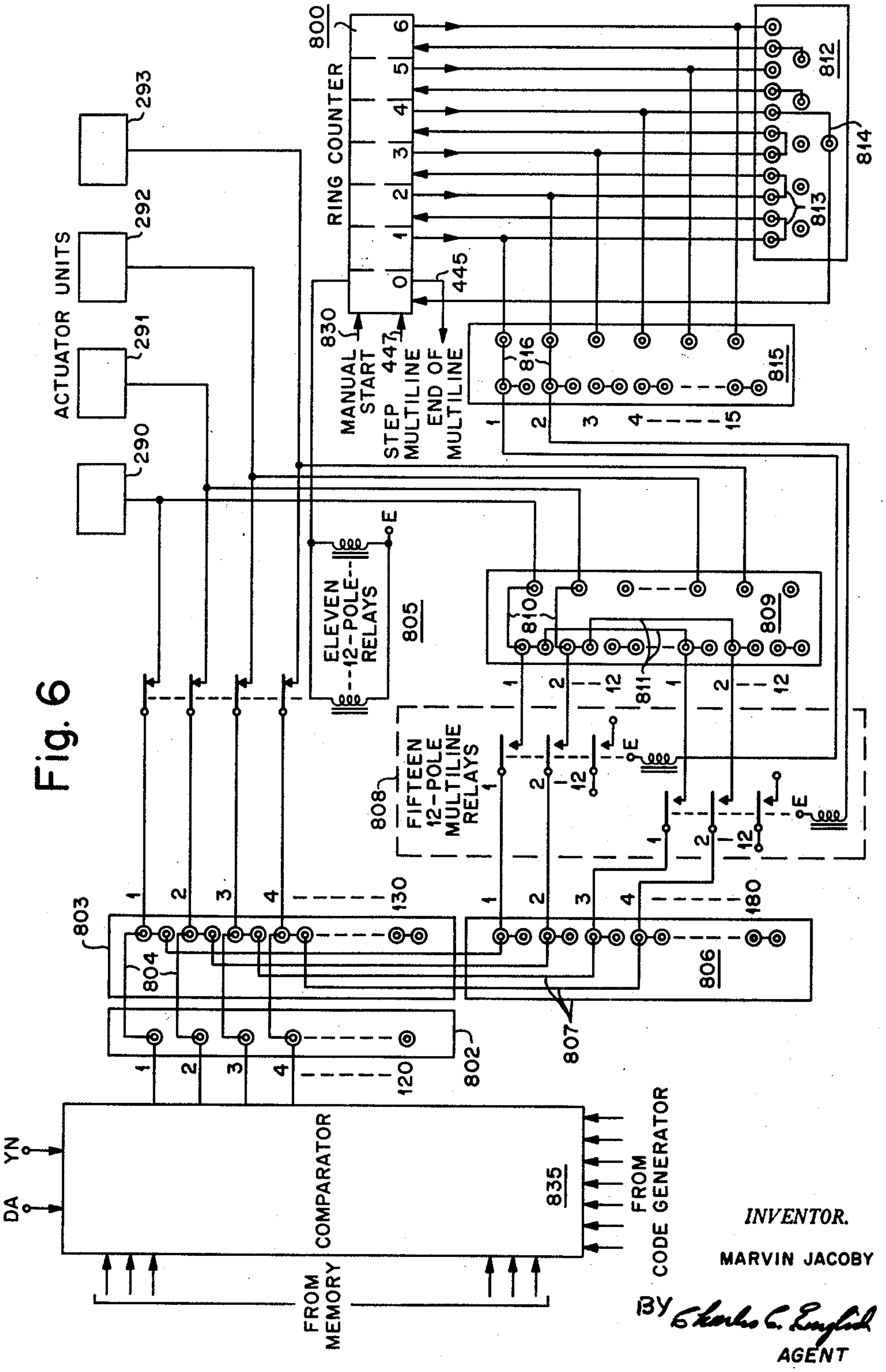
Figure 7:
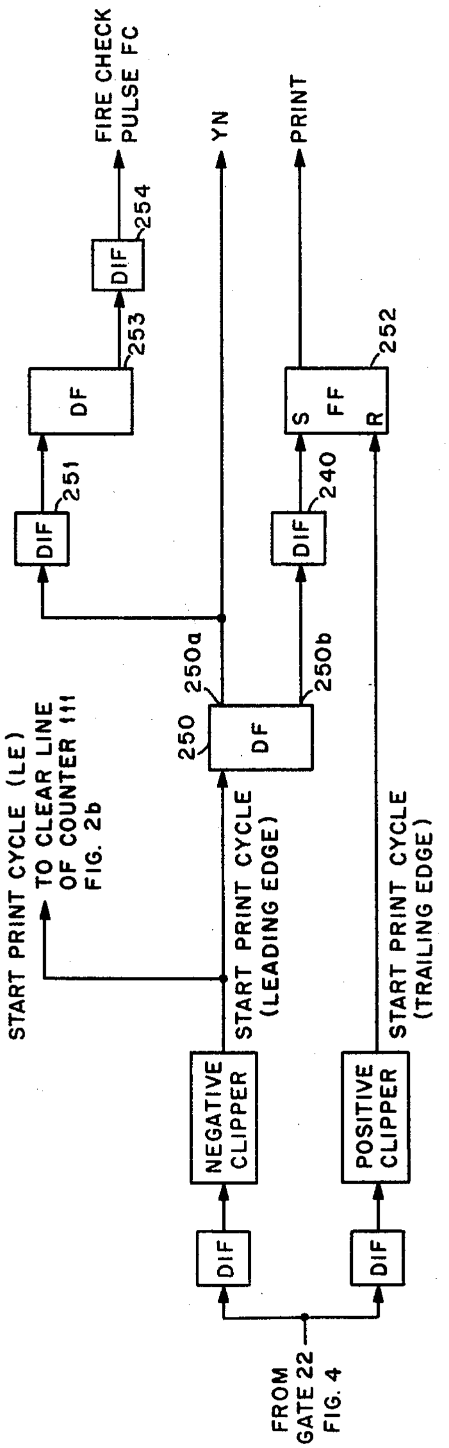
Figure 8:
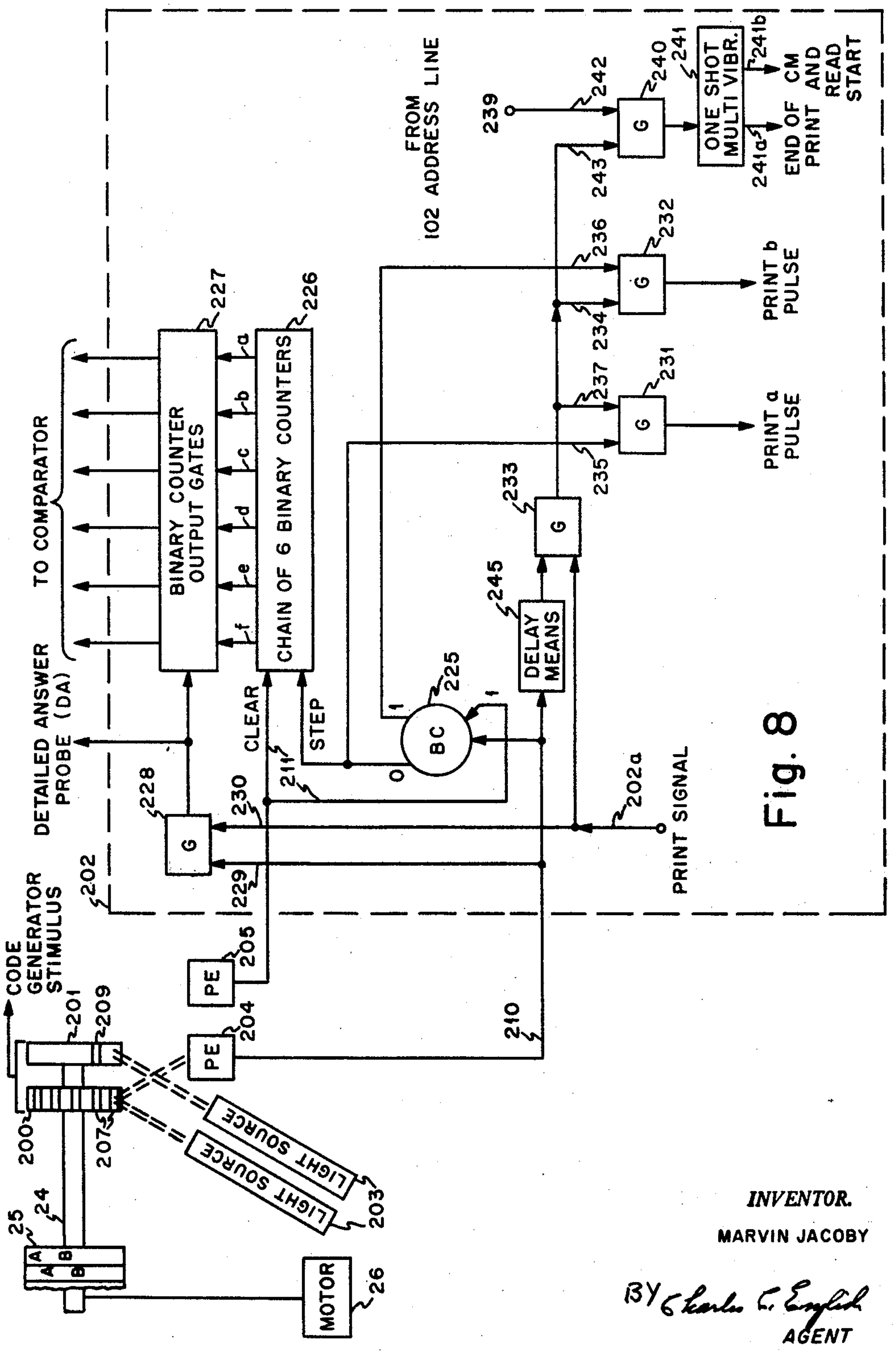
Figure 9:
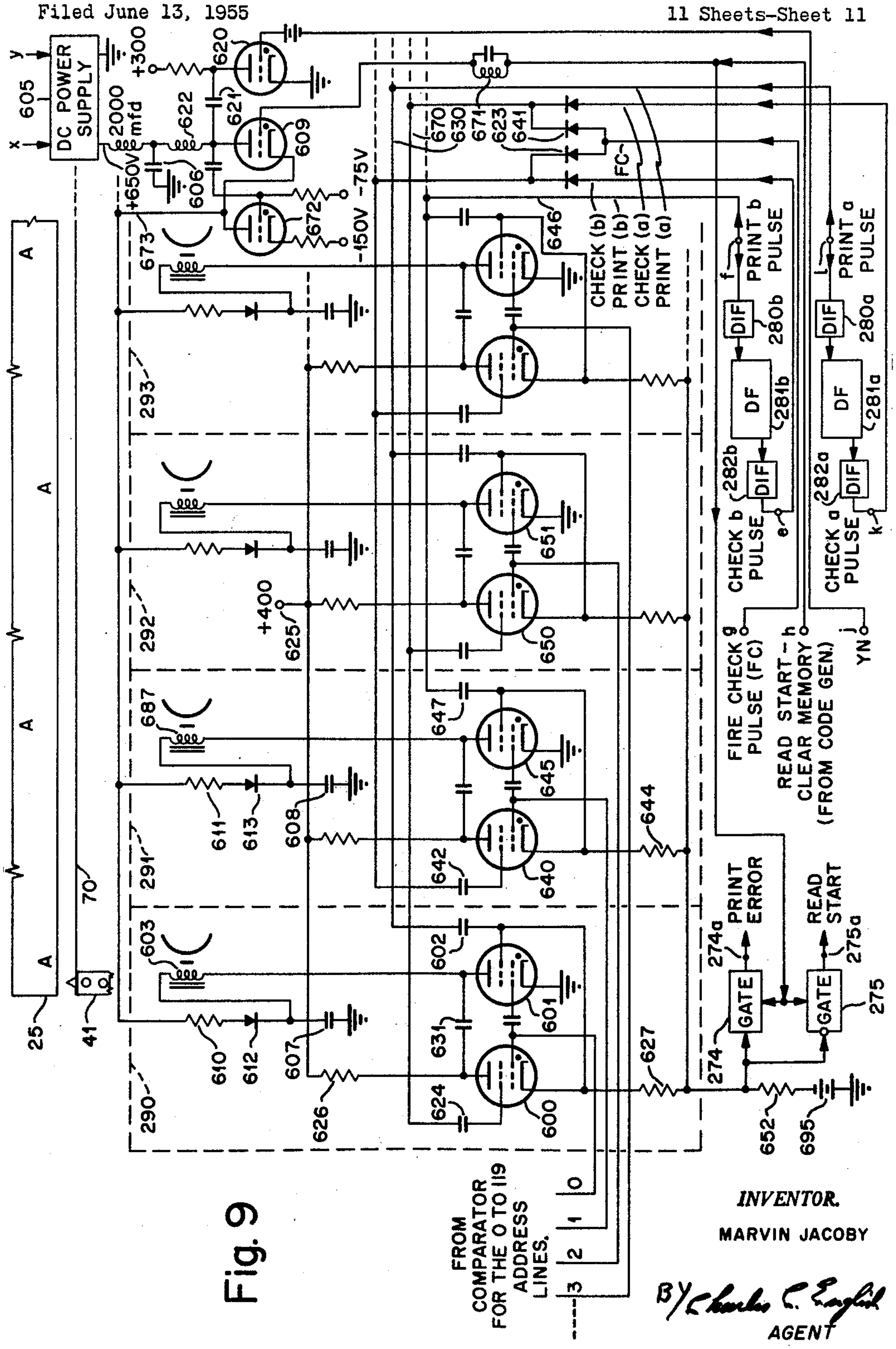

Other objects and features of the present invention will become apparent upon a careful consideration of the following detailed description when taken together with the accompanying drawings, in which Figure 1 is a simplified block diagram showing in a generalized manner the organizational layout of the present invention, Figures 2*a* and 2*b* show in block diagram form the circuits for filling the memory system with coded information, Figure 3 shows in diagrammatic form the circuits used to suppress from the memory system certain predetermined codes which it is desired not to print, Figure 4 is a block diagram illustrating in greater detail the magnetic tape control circuits employed by the instant invention, Figures 5*a* and 5*b* show in detailed block diagram form the printing paper control circuits utilized by the present invention, Figure 6 is a simplified schematic drawing, partly in block, showing the circuits used to alter the interconnections between the various memory locations in the memory system and the print hammers included in the printer, Figure 7 is a block diagram of circuit components used to control the printing circuits shown in Figure 9, Figure 8 is a block diagram illustrating one possible type of code generator useable by the present invention, and Figure 9 shows in schematic form the print actuating circuits of the printer.

In the drawings and in the description to follow, the use of the term "delay flop" or the abbreviation "DF" will be taken to mean a one-shot multivibrator which has one condition of stability and two outputs. The first output, when used, which by the convention used in the drawings will be shown coming from a line directly opposite the input terminal, will be undelayed and will persist for a period equal to the period of instability of the circuit when it has been triggered. The second output, when used, will be shown in the drawings as coming from a line displaced from the input line and will represent the delayed output generated coincidental with the return of the circuit to its stable condition following the receipt of a triggering input. Also in the drawings, flip-flop circuits will be labeled by the abbreviation "FF," buffers by the abbreviation "B," and gates by the abbreviation "G." In the case of gates, the input terminals designated by a small circle will indicate an inhibition terminal, while the non-circled input terminals will indicate permission terminals. Signal pulses applied to the circled terminals, of course, will block the gate, while signals applied to the non-circled terminals will open the gate.

Wherever possible, similar reference characters have been used to indicate corresponding elements throughout the several figures comprising the drawings.

In a generalized sense, the organizational layout comprising the instant invention may be represented by the simplified block diagram shown in Figure 1, to which reference is now made. As aforementioned, the signals from which the printer derives its information exist in the form of binary code combinations. Although this invention is not limited thereto, one convenient manner for obtaining these signals is from a magnetized tape record. In a typical example, the tape carrying the binary coded information has six channels recorded across the width of the tape with each channel designating a different position in a six position code. In the code binary digit "1," present at any of the six positions, is represented by a magnetic spot recorded in an appropriate channel on the tape, while the binary digit "0" in any of the six positions is represented as an absence of a magnetic spot in the appropriate channel on the tape. Also included on the tape may be a separate channel which is used for "odd-even" check purposes. For reasons of simplification this channel will be disregarded in the discussion that ensues. A seventh channel referred to as a sprocket pulse channel has a magnetized spot occurring at each point along the tape where the other six information channels comprising a set of binary signals are to be recorded. For convenience, the information recorded on the tape appears in blockette form which comprises a record of 120 sets of binary signals disposed along the tape.

To reproduce the information recorded on the tape a suitable tape reproduction device, such as generally indicated at 10, is employed. This reproduction system includes a multi-channel head structure 10*a*, which includes a separate head for each of the channels recorded on the tape; a supply reel 10*b* and a take-up reel 10*c*. The tape is passed over the multichannel head 10*a* from the supply reel 10*b* to the take-up reel 10*c* at a uniform rate of speed by a motor 11. The motor 11 includes a shaft 12, which is coupled to the tape transport mechanism 10 through a suitable clutch 13 and brake mechanism 14. In practice, the clutch 13 and brake 14 may be electromechanically operated from a bistable control circuit 15, such as a flip-flop control. In this regard, the flip-flop circuit 15 is designed so that a signal coming in on its set input terminal S, such as by closure of start switch 17, energizes the clutch 13 and causes the tape transport mechanism to draw the tape across the head from supply reel 10*b* to the take-up reel 10*c*. To stop this action, a signal on line 18 arriving at restore input R of the flip-flop circuit 15 reverses the bistable device 15 to deenergize clutch 13 and energize brake 14, which stops further rotation of the tape transport mechanism.

As the tape passes over the multi-channel head 10*a*, the binary signals recorded on the magnetic tape induce pulsating voltages in the respective pick-up head, which voltages are applied through corresponding leads to a group of pulse shapers indicated generally at 19. In practice and for reasons which will appear more fully hereinafter, these pulse shapers may typically comprise flip-flop circuits which are operated to one condition of stability by the channel information pulses recorded on the tape and are periodically restored to the other condition of stability by a delayed sprocket pulse. The information thus derived from the tape by the pulse shapers 19 and multi-channel head 10*a* is applied through an address line selector 20 to a memory circuit 21. The memory circuit, which may be a gas tube type of memory such as disclosed in the Eckert and Masterson application supra, will include as many distinct memory locations as there are sets of binary signals in the blockette, which in this case is 120. Each of these memory locations includes a separate gas tube for each of the six information channels recorded on the tape. In practice where the odd-even check pulse channel is used, seven gas tubes are employed at each memory location, but as mentioned hereinabove only six information channels will be considered. The address line selector 20, which operates in general as a distributor, functions to take each successive set of binary signals recorded on the tape and to apply these sets to successive positions in the memory. The address line selector may be of any convenient design. For example, a set of binary counters having at least 120 states and a decoding matrix coupled to the counter represents a typical address line selector. In the operation of the address line selector, each sprocket pulse derived from the magnetic tape is applied to the stepping input of the address line selector 20 in such a manner that the first set of binary digits is applied to the first memory location, the second set to the second memory location, and so on. After the address line selector has gone through 120 steps and the memory circuit 21 is filled, the address line selector controls the generation at line 18 of an end-of-read signal which deenergizes clutch 13 and energizes brake 14 to stop further information from being read in to the memory circuit 21. In this manner, all the information in a given blockette is stored in the memory 21, and the machine is now ready to start a print cycle.

As the tape drive control circuit, flip-flop 15, energizes brake 14 to inhibit further reading from the tape, it also sends a permissor signal back through line 21*a* to gate circuit 22. In response to the combined effect of the permissive signal from control circuit 15, and a second permissive signal (end of paper-feed signal generated by paper brake signal source 45 as later described), gate circuit 22 does two things; it sends a signal back through differentiator 60 to the reset input 61 of the address line selector 20 to clear the counter in this unit (the counter here is also initially cleared by switch contact 16 when the printer is first started), and it transmits another signal to code generator 23. This latter signal functions to permit the output of the code generator to appear at the several output terminals coupled to this device. As indicated, code generator 23 includes an element which is ganged to the shaft 24 of the print wheel 25 and is rotated synchronously with the print wheel by motor 26. Code generator 23 generates a changing binary code, the instantaneous code combination of which is representative of the type character contained on the print wheel 25 that is instantaneously under the print hammer head 27. This changing binary code is applied through a set of output lines 28 to a comparator 29, wherein the coded information stored in the memory is compared with that generated by code generator 23. This comparison is effected in such a manner that as the code generator delivers a binary signal representative, for example, of the character A, all the A's recorded in the memory circuit 21 are compared simultaneously. In practice, there is one comparator circuit for each memory location in the memory circuit 21. These comparators control the actuation of the individual print hammers located in the printing head 27 through the operation of the printing circuits 30. Also coupled to the printing circuits 30 is a print control signal fed in on line 31 from the code generator 23. This signal appears in the form of a series of pulses, two pulses for each new code combination generated by the code generator 23. To digress momentarily, it will be seen by reference to the Eckert and Masterson application supra, that each peripheral type row contains a total of 51 different characters, with the identical characters in successive peripheral rows being angularly staggered in an alternating manner. In more particular, identical type characters in the odd numbered peripheral rows lie in one common longitudinal plane, while those in the even numbered peripheral rows lie in a second plane half-way angularly displaced from the plane of the odd numbered peripheral rows. Thus, although the code generator need only generate 51 different code combinations, two slightly time displaced printing pulses must be generated for each code combination in order to take into account the difference in time of arrival of the odd and even numbered peripheral type rows under the print hammers. The print control signals derived from the output of the code generator are also fed back through a line 32 to the step input of the address line selector. This connection advances the counter in the address line selector two steps for each of the different code combinations which the generator 23 generates (a total of 102 steps). After the generator has produced all the different code combinations which are printable by the typewheel 25, the counter in address line selector 20 attains a predetermined count (102) and sends a signal back through line 33 to the code generator 23. In response to this signal, the code generator 23 stops delivering signals on its output lines 31, 28 and 32 but delivers a momentary signal on its output line 34 which does a number of things. The signal on the line 34 is applied to the memory circuit 21 as a clear signal to clear the memory circuit; it is also applied to input 61 of the address line selector circuits 20 to clear this circuit; and it is further applied as a read start signal through now closed switch contacts 17 to the flip-flop control circuit 15 to energize clutch 13 and deenergize brake 14. This permits the next blockette of information recorded on the tape to be read into the memory. At the same time that control circuit 15 removes the brake 14 energization, the signal on line 21*a* which was applied to gate 22 is removed. The removal of the signal on line 21*a* operating through gate circuit 22 functions to suppress further outputs from the code generator 23 until the next printing cycle is inaugurated.

The momentary signal on the output line 34 of the code generator 23, which as above described starts a new read-in cycle for the memory, is also applied through line 35 to a paper feed control circuit 36 so as to initiate print paper movement during the read-in cycle in a manner now to be described. Circuit 36, like circuit 15, is a bistable switch which, when energized from the input from line 35, operates to energize a clutch 37 and deenergize a brake 38. As clutch 37 is energized, the motion imparted to shaft 39 by the motor 40 is translated to a paper advance sprocket 41, which starts to feed the print paper 70 through the machine. For purposes of simplification, the ribbon and ribbon feed mechanism usually associated with the printing paper and hammers have been deleted from the drawing since any conventional ribbon control mechanism may be used if desired. Affixed to the paper advance wheel is an optical flat 42, on which a source of light 43 is focused. As the paper is advanced and the optical flat 42 rotated, the light from source 43 is reflected by the optical flat 42 to a photocell 44. This occurs when the paper has been advanced a suitable space or number of spaces. The photocell 44 operating through a paper feed brake signal source 45 is actuated to deliver a control signal through a gate 46 to the paper feed control circuit 36. This signal restores the paper feed control circuit 36, energizing brake 38 and deenergizing clutch 37 to stop further rotation of the paper advance wheel 41. To insure that the next print cycle does not occur until after the paper feed has stopped, the paper feed brake signal source 45 also delivers a control signal to the control circuit 22. The signal from source 45 together with the signal from flip-flop 15 occurring on line 21*a* at the end of a read-in cycle provide the two permissor signals for gate 22 as above described.

Since a six position code is used and only 51 characters are carried by the print wheel 25, it is apparent that the number of code combinations which can be fabricated using a six position code is greater than the number of printable characters. The excess of these code combinations can be utilized to initiate certain command signals for the machine. These command signals, which appear as binary code combinations recorded on the magnetic tape and distinguishable from those code combinations which represent print characters on the print wheel, can be derived from the pulse shapers 19 by a conventional decoding matrix network 49, for example, and fed to other control equipments in the machine. For example, one or more of the command code combinations could be used to produce a fast feed operation for the paper drive. These control signals usually occur, if at all, as the first character in a blockette of information on the tape, and when reproduced by the head 10*a* produce an output from the matrix 49. In the event of a fast feed symbol, matrix 49 produces a pulse output at 62, for example, which is fed to a fast feed stop signal source 50 and to the set input of flip-flop 63. The latter connection to the flip-flop 63 operates in response to the receipt of a fast feed signal from matrix 49 to block the gate 46 and thus prevent the paper brake signal source 45 from shutting off the paper feed circuit 36. The fast feed stop signal source 50, on the other hand, operates upon receipt of a fast feed command signal to replace the normal action of the paper brake signal source 45. To stop paper feed under these conditions, a separate paper feed program loop 51 is utilized. This loop may be a continuous paper belt which includes a series of perforations located thereon and driven from the paper advance wheel so that the perforations bear a certain relationship to the position of the paper under the print head 27. Hence, under the command of the fast feed signal derived from matrix 49, gate 46 is inhibited by the flip-flop 63 and the paper brake signal derived from source 45 is blocked from paper feed control circuit 36 by gate 46. Paper advance wheel 41 then continues to rotate, driving the program loop 51 until one of the holes in this tape registers with a corresponding one of the contacts 52 of the fast feed stop signal source 50. At this point, the fast feed signal source 50 delivers a restore output signal to the flip-flop 63 which removes the inhibit from gate 46 to permit the normal stopping of paper via the paper brake signal source 45, the gate 46, and the paper feed control circuits 36.

With the foregoing generalized picture of the printing machine in mind, the details of the manner in which the coded information is fed into the memory circuits and the operation of the pulse shapers will now be discussed in connection with Figs. 2*a* and 2*b* to which reference is now made.

As indicated above, each character to be printed has been previously recorded in coded form on some recording means as, for example, on magnetic tape. The input circuits of the machine transfer these characters from the tape to the memory. The input section of the machine comprises also driving means for moving the recording medium across a reading head. Both these driving means for the recording medium and the input circuits are illustrated in Figure 2*a*.

Figure 2*a* shows on its left hand side the magnetic head 10*a* and a supply reel 10*b* from which the magnetic tape is moved across the magnetic head to the take-up reel 10*c*. This motion is accomplished with the help of a motor 11 and is controlled by a clutch 13 and brake mechanism 14, as described herein above. The clutch and the brake, in turn, are controlled by signals from the flip-flop circuit 15 and the signals derived therefrom will be explained hereinafter in connection with Fig. 4.

If the recording was done on a magnetic tape, as is assumed herein for the purposes of illustration, a character may appear on that tape as a row of small magnetized spots. When the tape carrying such rows of small magnetized spots is moved across the magnetic head, these spots are converted into electric impulses. It is assumed, for purposes of illustration, that the number of magnetic channels on the tape is seven. In such case, one of the seven channels, preferably one of the center channels, carries a sprocket channel pulse which is a timing pulse and does not bear any intelligence. The other six channels, in contrast thereto, are provided for the selective representation of the digit code combinations. The pulses emanating from these six channels shall be called information pulses or information signals so that they may be distinguished from the sprocket channel pulses.

Characters may arrive at the magnetic head approximately every eighty microseconds. This means that every eighty microseconds one sprocket channel pulse is received. The magnetic head which is an electromagnetic transducer transforms this sprocket channel pulse into an electric impulse which is amplified in a conventional amplifier 100. The amplified sprocket channel pulse may be slightly delayed relative to the simultaneously arriving information pulses occurring in the six information channels, as by applying the sprocket pulse to a conventional delay element 101. The delayed sprocket channel pulse is then shaped by a squarer 102 and differentiated by differentiator 103. The differentiated signal is referred to in the specification and drawings as sprocket pulses SP appearing on line 104.

The machine uses three signals which are derived from the original sprocket channel pulse SP. These three signals are the sprocket pulse SP, as described, and successively delayed sprocket pulses SP1 and SP2. The latter pulses are produced by means of any suitable known delaying device 105 coupled to the line 104. The respective delays may be, preferably, so arranged that the sprocket pulse SP1 occurs about five microseconds after the sprocket pulse SP, and that the sprocket pulse SP2 occurs about two and one-half microseconds after the sprocket pulse SP1 or seven and one-half microseconds after the sprocket pulse SP. The purpose of using three sprocket pulse signals and the described time relationship will become apparent hereinafter when the application of these signals is discussed.

Turning back now to the magnetic head 10*a* and to the assumption that the tape carries six information channels, the electromagnetic transducer 10*a* transforms the magnetic information signals into essentially simultaneous electric information signals. It ought to be stressed, in this connection, that it depends entirely upon the selectively applied binary code combination which ones of the channels carry a signal (binary "1") and which ones of the channels are, at a given time, without a signal (binary "0"). For the purpose of illustration, it is further assumed that the code combinations are arranged as indicated in the binary system. This means that the code combination consists exclusively in selective combinations of 0's and 1's because there are no other figures available in the binary system. The presence of a signal may then be interpreted as a "1," and the absence of the signal may be interpreted as a "0," or vice versa.

Each electric information signal appearing in a respective channel on the tape and emanating from the corresponding electromagnetic pick-up in transducer 10*a* is amplified in a corresponding amplifier A and transmitted to the set inputs S of respective input flip-flops I to VI. These flip-flops, and all flip-flops hereinafter referred to, may be conventional bi-stable devices which are set to one condition of stability in response to the occurrence of signals on their set input terminals S and restored to a second condition of stability in response to signals applied to their restored inputs R. Under the assumption that the tape carries six information channels, the machine provides six input flip-flops I to VI inclusive, each of which corresponds to one of the six information channels on the tape. For the purpose of simplification, only the input flip-flops I, II and VI have been shown. It follows from the application of binary code combinations that, in every individual combination, some of these input flip-flops receive a signal from the transducer while other do not receive such signals. The flip-flops which receive a signal are set, in contrast to the flip-flops which do not receive a signal and which, therefore, remain in their restore state. The input flip-flops which are set transmit a signal to respective input gates G2 I to G2 VI inclusive, of which only G2 I, G2 II and G2 VI are shown. The signal from an input flip-flop to its associated input gate conditions such gate for passage of another signal which goes into the memory. This other signal is the sprocket pulse SP1 derived from delay line 105, and applied in parallel to the gates G2 I to G2 VI in the manner hereinafter described. It now becomes evident why the pulse SP1 occurs about five microseconds after the pulse SP, as described hereinabove. The pulse SP1 is to become effective at a time when the input gates are already selectively conditioned for the passage of SP1. This explains also why flip-flops are provided for the emission of the conditioning signals to the input gates because this way the input gates are kept open for the passage of SP1 as long as their respective input flip-flops remain in the set state.

Figure 2*a* shows, in its top section, a conventional delay flop (DF) 106. When triggered, delay flop 106 produces a separate output at each of two output terminals 107 and 108. The output occurring at terminal 108 occurs instantaneously with the triggering of the circuit and lasts for 29.9 microseconds, while the output at the terminal 107 occurs delayed from the instant triggering by 29.9 microseconds. There are three different signals which may go into the input of the delay flop 106 to trigger this circuit. The pulse SP1, is the only one among these three different signals which appears during a read-in cycle, that is, during the time that information is being transferred from the tape to the memory circuit. The other two signals, called print "*a*" pulse and print "*b*" pulse, originate in the code generator of Figure 8, and will be described later. These last mentioned signals appear exclusively during the print cycle of the machine and have no connection, therefore, to the transmission of information signals into the memory. As indicated in the drawing, it is the undelayed output of delay flop 106 appearing at output terminal 108 which travels through the input gates, G2 I through G2 VI, via gate 114 provided that the input gates are conditioned for passage of a signal from their associated input flip-flops I through VI. After passing the input gates, the sprocket signals SP1 as shaped by delay flop 106 enter the memory of the machine where they are applied to the grids of specific memory thyratrons, as will be explained hereinafter.

After 29.9 microseconds, delay flop 106 restores. This means that 29.9 microseconds is regarded as the maximum time available for the transfer of information into the memory. The differentiated restore output produced by differentiator 109 is used for three purposes, as indicated in the drawing. First, the differentiated restore output of the differentiator 106 is fed back through line 110*a* to the restore terminals of the input flip-flops to restore these circuits; second, the same output appearing on line 110*b* is used as a signal that characters have been transferred into the memory, which signal is the restore signal for the prevent read-in flip-flop 401 in Figure 3; and third, this restore output steps the address-line seven-stage binary counter 111 through line 110*c* as shown in Figure 2*b*.

It has been stated hereinabove that the print "*a*" pulse and the print "*b*" pulse also applied to the delay flop 106 appear exclusively during the print cycle of the machine, as will later be described. During the print cycle, the tape from which the memory is filled is stopped and consequently there is neither a need for restoring the input flip-flops nor a need for restoring the prevent read-in flip-flop 401. Therefore, the only purpose of using (set) signals for delay flop 106 is to obtain the third effect mentioned above, namely to step the seven-stage binary counter 111. This counter counts during the print cycle the steps involved in the printing operation for reasons which will be explained hereinafter.

The memory 21 in Figure 2*b* comprises, in the given example, 720 thyratrons which are arranged in 120 address-lines, or memory locations, corresponding to the 120 sets of binary signals used to comprise one blockette of signal information stored in the magnetic tape. Each line or memory location labeled 0 to 119 in the drawing contains the six tubes needed to store the six binary symbols of the assumed six-position code combination. The memory is capable, therefore, of storing 120 sets of binary characters. When a binary character from the tape is read into the memory, one specific line of tubes must be alerted to receive it. The address-line seven-stage binary counter 111 which can count up to and including 128 remembers which one of the 120 address-lines should be alerted. Since the memory has only 120 address-lines, the last eight counts of the seven-stage binary counter are not used. The binary counter is stepped 120 times which corresponds to the storage of 120 characters.

In order to select the appropriate address-line, the binary counter 111 outputs are applied to the address-line decoder or matrix 112 which may be of any conventional design. This matrix 112, which together with counter 111 corresponds to the address line selector or distributor 20 of Fig. 1, applies an enabling voltage in parallel, as shown, to the grids of all the memory tubes in each address-line in succession.

The address-lines are numbered from 0 to 119. Whenever the address-line seven-stage binary counter 111 is cleared, the six thyratrons I to VI on the 0 address-line are primed at their grids to receive the first binary character derived from the blockette of information stored on the magnetic tape.

Each successive sprocket pulse SP1, of course, steps the counter 111 one position and primes the next memory location in sequence. Whenever the binary counter reads 119 the six thyratrons on the 119th address-line are primed to receive the 120th character.

As indicated hereinabove, the binary digit "1" is represented by a pulse appearing on the tape while the binary digit "0" is represented by the absence of a pulse. Thus, from the foregoing it will be seen that in the memory circuit the binary "1" stored on the tape and applied through the appropriate gates G2 I through G2 VI to the grids of the memory thyratrons will ignite the corresponding memory tubes to indicate storage of the digit "1," while the binary digit "0" which is represented by an absence of a pulse leaves the corresponding memory tubes in a non-conducting condition.

For obvious reasons, the binary counter 111 is cleared to 0 before either a reading or a printing operation. Three signals may be used to instigate a clear in the binary counter. These are indicated in the top section of Figure 2*b*. There is first the "read start" signal from gate 275 in Figure 9 later to be described; there is further the "manual start" signal which originates at the control board of the machine; and there is finally the "start print cycle" leading edge (LE) signal which originates in the print control circuits in Figure 7, and which appears at the beginning of every print cycle.

Figure 2*b* shows, for reasons of simplification, only four address-lines, namely address-lines 0, 1, 102 and 119. These four lines have been selected for specific showing because they do not only furnish the priming signal to the grids of the associated memory tubes but their respective signals are also used outside of the memory section of the machine. The address-line 0 signal and the address-line 1 signal are applied to the fast feed circuits (Figure 5*b*), as will be explained hereinafter in connection with the fast feed operation. The address-line 102 signal is fed to gate 240 through terminal 239 in the code generator (Figure 8) to indicate that 102 printing steps have been performed as later described.

Turning back now to the operation of the thyratrons in the memory, it has been stated already that, due to the operation of the seven-stage binary counter 111 and of the address-line selector decoder 112, only one address-line is conditioned, at any given time, to store the information signals coming through the input gates. This conditioning is accomplished by connecting the grids of the tubes in each memory location to the selected address-line output of the decoder 112 which supplies a voltage which, in combination with the additional voltage furnished by the signals coming through the input gates, produces the necessary bias to ignite the thyratrons.

As to the anodes of these tubes, they are normally kept at a relatively high voltage as, for example, plus 213 volts by the output of another delay multivibrator or the delay flop DF113 causing a much lower voltage as, a printing cycle is complete, the clear memory signal coming from the read start line in Figure 4 triggers the delay flop DF 113 causing a much lower voltage as, for example, plus 55 volts to be applied to the anodes of all the memory tubes for a short interval of time. This de-ionization process lasts for 5.5 milliseconds, as a result of the operation of delay flop 113.

Referring again to the input flip-flops shown in Fig. 2*a*, the output signals from these flip-flops do not only go to the input gates G2 I to G2 VI as explained hereinabove, but are also transmitted to the nonprinting special symbols decoder 49 shown in Figure 2*a* and again in Figure 3. This decoder may have the form of a conventional matrix network and is identical with the matrix 49 shown in Figure 1. The decoder 49 operates to produce output signals on predetermined ones of its several output lines whenever predetermined codes are set up on the input flip-flops by the codes stored on the tape. The "nonprinting special symbols" referred to in the name of the decoder have already been briefly explained hereinabove as command signals for the machine. The code combinations representing such command signals differ, of course, from all those combinations which symbolize the characters to be printed. These signals are, therefore, not to be stored in the memory circuit since they do not represent printable information. To give a few examples for command signals of this kind, the following command signal output lines are shown at the decoder of Figure 3: fast feed 1, fast feed 2, stop, and multiline, each of which is represented by a separate binary code, which is distinguishable from the printing codes and from one another, stored at the first position in a blockette of information on the tape.

Fast feed is one among the many features of the machine which serve to speed up its operations. Its purpose is to move the paper in one single operation from the last line which was previously printed to any desired distant line on which the next following printing is to be performed, thus eliminating any stepwise motion of the paper. Details of this will be described in a subsequent section of this specification. The only point to be discussed here is the fact that the magnetic tape may carry command signals to the machine for fast feed, stop, multiline, etc. and how these command signals are blocked from the memory.

Figure 3 shows two fast feed output lines from the nonprinting special symbols decoder 49 which carry the label fast feed 1 and fast feed 2, respectively, one multiline, and one stop signal. This means that there are at least two different fast feed code combinations, one stop signal, and one multiline signal which may be received from the magnetic tape and decoded in the decoder. The resulting output signals fast feed 1 or fast feed 2, stop, and multiline leave the decoder 49 upon arrival of the correlated sprocket pulse SP1 applied to terminal 404 of decoder 49. These output signals, representing nonprintable information, are buffed by suitable buffer amplifiers B into the set input terminal 402 of the prevent read in flip-flop 401. The flip-flop 401, when set, sends an inhibitory signal to gate 114 in Figure 2*a* which prevents the stretched output signal from delay flop 106 from passing through this gate. As a result, there is no signal which could pass through the input gates G2 I through VI, and the present code combination is not fed into the memory, therefore. After 29.9 microseconds delay flop 106 (Fig. 2*a*) restores, and its restore output signal is fed back under the label of "character transferred" to the restore input terminal 403 of the prevent read in flip-flop 401 in Figure 3. As soon as flip-flop 401 restores, the inhibitory signal to gate 114 in Figure 2a is removed, and subsequent printable code combinations appearing on the tape blockette may then be fed to the memory circuit for storage.

The decoder decodes not only command signals, as described so far, but it decodes also the code combination which represents a decimal zero. This is done for the purpose of suppressing the printing of zeros, if so desired. The arrangement and operation of the zero suppress circuits will be explained in a subsequent part of the specification. The only point to be stressed at this time is the fact that, whenever a zero is not to be printed, a sprocket pulse SP1 is sent through the zero suppress control gate 406 (Fig. 3) to the set input terminal 402 of the prevent read in flip-flop 401 to inhibit gate 114 in Figure 2a, as described hereinabove.

Figure 4 shows on its right hand side the tape drive flip-flop 15, the operation of which controls the clutch and brake mechanism of the tape drive, as mentioned hereinabove in connection with both Figure 1 and Figure 2. Turning now to the circuits which govern the operation of this flip-flop 15, there is first at a terminal 462 the input of the manual start signal which comes from the control board of the machine and which occurs whenever the machine is initially started. After the machine has completed its first read-in cycle and subsequently its first print cycle, an automatically produced signal takes the place of the original manual start signal. This automatic signal is called read start signal and enters the circuit at the terminal 460, shown on the left of Fig. 4. It comes from gate 275 in the print circuits of Figure 9, and emanates from that gate whenever a print cycle has arrived at a successful conclusion.

The read start signal, after entering at point 460, is applied to gate 461 which, during normal operations, is always open. This gate receives an inhibitory signal only if and when the multiline in process flip-flop 442 is set. This flip-flop 442 will be discussed hereinafter in connection with multiline operations. It suffices, at this point, to state that the machine does not read in while multiline is "in process." The read start signal is, therefore, not permitted to pass through gate 461 under those conditions.

Whenever gate 461 is open, the read start signal arriving at the terminal 460 or alternatively the manual start signal arriving at terminal 462, is coupled, under the label of clear memory, to delay flop 113 in Figure 2b, the output of which causes the memory tubes to de-ionize, as explained hereinabove.

At the same time, the read start or alternatively the manual start signal sets delay flop 463 which has a delay time of 2.5 milliseconds and which produces an output signal when it returns to its restore state. This delay is introduced as a necessity. The clearing of the memory takes about 5.5 milliseconds, and it is, therefore, desirable that the input flip-flops of Figure 2a do not begin to send out signals before this clearing operation is completed. An essential part of the necessary delay is already provided by the fact that it takes some time to set flip-flop 15, to energize the clutch mechanism 13 through the set output of this flip-flop 15, to bring the tape drive up to its normal speed, and to cover the space between blockettes. Delay flop 463 provides the additional delay of 2.5 milliseconds to ensure that the signals from the magnetic head 10a of Figure 2a do not arrive too early in the input circuits.

The output signal from the delay flop 463 is then differentiated by the differentiator 464 and buffed by a conventional buffer circuit B into the set input terminal 466 of the tape drive flip-flop 15. The set output of this flip-flop 15 energizes the clutch 13, shown in Figure 2a, and the tape begins to move across the electromagnetic transducer. This represents the beginning of the read-in cycle during which the memory circuit is being filled with printable information.

It has been mentioned hereinabove that during read-in the address-line 119 signal (Figure 2b) not only primes the memory tubes in address-line 119, but also permits the restoring of the flip-flop circuit 15 to terminate the read-in cycle. The input of the address-line 119 signal into the circuits of Figure 4 is shown at the terminal 492 as a permissive signal applied to gate 491, permitting the next following sprocket pulse SP2 arriving on terminal 490 from delay line 105 (Figure 2a) to pass through this gate 491. After passing this gate, SP2 sets the 120 check flip-flop 493. This flip-flop 493 is, therefore, set whenever the seven-stage binary counter 111 of Figure 2b has counted 120 read-in steps. The set output of flip-flop 493 produces a permissive signal to gate 482. Flip-flop 493 is restored through the application of either the manual start signal or the automatic application of the read start signal.

After gate 482 has been alerted through the application of the set output signal from flip-flop 493, the restore output from a resettable delay flop RDF481 may pass through gate 482, and the operation of this resettable delay flop will now be explained. Every time a sprocket pulse SP arrives from line 104 in Figure 2a it is applied to input terminal 480 of resettable delay flop 481 to set the delay flop 481. This resettable delay flop is a one shot multivibrator which has a delay time of 400 microseconds. When it restores, it produces the output signal which passes through gate 482. It will, however, restore only if and when 400 microseconds have been elapsed since the arrival of the very last sprocket pulse SP. Such circuits have been used in radar systems as pulse stretchers. A typical such circuit is disclosed in U.S. Patent No. 2,719,226, issued Sept. 27, 1955, to Gordon et al., filed June 4, 1951.

It has been stated hereinabove that, in general, characters and sprocket pulses arrive at the magnetic head approximately every 80 microseconds. Let us assume now that, for some reason, characters and sprocket pulses arrive at a much slower speed. This will happen, for example, if the characters on the magnetic tape have been spaced so far apart that there are only 50 characters per inch of magnetic tape. Normally, and assuming the 80 microsecond spacing between characters, these characters are so spaced that 100 characters appear on one inch of tape. This means that in the assumed example of 50 characters per inch, the characters and sprocket pulses may arrive every 160 microseconds, and it would be safe to assume in this case that no more sprocket pulses will be received within the given blockette after 200 microseconds have elapsed. A delay of 200 microseconds would, therefore, be a sufficient delay. For safety reasons this delay was, however, doubled to 400 microseconds.

After 400 microseconds have elapsed since the arrival of the last sprocket pulse SP, the restore output of delay flop RDF481 passes through gate 482. This gate 482 is open for passage after the 120 count. The signal is then differentiated by the differentiator 483 and applied through a buffer circuit B to the restore input terminal 467 of the tape drive flip-flop 15.

As soon as flip-flop 15 restores, the clutch 13 is deenergized and the brake mechanism 14 is activated. As a result, the motion of the tape across the reading head comes to a stop and the read-in cycle is complete.

The same output signal from flip-flop 15 which energizes the brake mechanism is also applied as a sustained permission to gate 22 during the time that printing should occur. If this restore signal from flip-flop 15 coincides with the end paper feed signal from the paper feed circuits in Figure 5b, it passes through gate 22 and operates from thereon as the start print cycle signal as will be discussed hereinafter in connection with the explanation of the printing operations.

Gate 22 performs two functions. One function which was explained in the preceding paragraph is to inaugurate a new print cycle whenever a read-in cycle has been completed. The other function is to bring the machine to a standstill, either automatically or at the option of the operator. In other words, if the machine is to be brought to a stop, this stop occurs at the end of a read cycle. This is effected by an inhibitory signal to gate 22 as a result of which the restore output signal from the tape drive flip-flop 15 cannot pass through to become the start print cycle signal. The signal which operates as an inhibition on gate 22 is sent by the stop flip-flop 471 whenever this flip-flop is put into its set state. Figure 4 shows three signals which may set the stop flip-flop 471. There is, first, the manual stop signal from the control board. This signal enters the circuits of Figure 4 at the terminal 476, is then differentiated by differentiator 477 and sets delay flop 475 for a period of one-third of a second. Delay flop 475 operates as a pulse stretcher. Its set output signal lasts, therefore, one-third of a second and passes through gate 474 to enter the stop flip-flop 471 at its set input terminal 472. If the manual stop switch on the control board is operated after the restore output signal from tape drive flip-flop 15 has begun to pass through gate 22, the passage of the manual stop signal through gate 474 is blocked through the inhibitory effect of the start print cycle signal on this gate 474, as illustrated in Figure 4. This prevents stopping the machine in the middle of a print cycle.

The second signal which may set the stop flip-flop 471 is a stop signal from the tape which comes from the nonprinting special symbols decoder 49 of Figure 3 and enters the circuits of Figure 4 at the terminal 478. The third signal which may have a setting effect on stop flip-flop 471 is the print error signal which comes from gate 274 in the print circuits of Figure 9. The stop flip-flop 471 is restored through application of the manual start signal to its restore input terminal 473.

There may be also a temporary inhibition of 20 milliseconds during multiline operations. This temporary inhibition will be discussed in that section of the specification which deals with the multiline circuits.

The paper feed circuits will now be described and integrated into the operation of the rest of the machine. The paper feed circuits are primarily used to feed paper, but they also generate signals which control the operation of circuits not associated with paper feeding. (It will be appreciated that this is important in the functioning of such a complex apparatus.) As an example, paper cannot be fed during a printing cycle and a printing cycle cannot be initiated until an "end paper feed" signal has been generated. The paper feed circuits permit two basic types of feed to occur which may be called "normal feed" and "fast feed." The "normal feed" operation will be described followed by a description of the "fast feed" operations. However, before considering the "normal feed" operation, an examination will be made of firstly, the conditions when the machine is initially started, and secondly, how some of the signals used in the paper feed circuits are generated.

As previously described, the normal operating cycle consists of concurrent "read in" and "paper feed" cycles followed by a "print cycle." During this normal cycle, an "end paper feed' signal is generated by the paper feed circuits, without which the "print cycle" cannot be initiated by gate 22, Figure 4. When the machine is first started, there may be no requirement that paper be initially fed, but an "end paper feed" signal must be somehow generated so that a "print cycle" may commence upon the completion of the "read in" cycle. The end paper feed signal is generated in the following way. Referring now to Figures *5a* and *5b*, the "manual start" signal (shown at the lower right in Figure *5b*), initiated when the machine is first started, passes through buffer 354 and triggers a delay flop DF 320 which produces a signal on its lower output line (delayed output) ten milliseconds later. This delay flop 320 output signal passes through differentiator 346 and uninhibited gate 303, setting a flip-flop FF 312 whose output generates the "end paper feed" signal, thereby subsequently allowing the first "print cycle" to take place as will hereinafter be described. Thereafter, the "end paper feed" signal is generated automatically as the machine performs its operation. It can be seen that although paper may have never been fed, an "end paper feed" signal is simulated by the "manual start" signal when the machine is first started.

Having described how the initial "end paper feed" signal is generated, there will now be described the derivation of certain signals utilized in the operation of the paper feed system. In particular, these are certain of the fast feed signals which are derived from the program paper-loop system 386 (Figure *5a*) and the paper-feed stop signal derived from the paper-feed commutator 399. Commutator 399 corresponds to the single optical flat 42 shown in Figure 1, and paper-loop 380 corresponds to the paper-loop 51 of Figure 1. The source of other signals utilized in the paper-feed circuits will be described hereinafter. In Figure *5a*, it will be observed that the paper-feed commutator 399 and the program paper-loop drive 385 are mechanically ganged on the shaft 39 which also drives the paper feed sprocket 41 shown in Figure 1. Also connected to shaft 39 are paper-feed brake 38 and the paper-feed clutch 37. Clutch 37 and brake 38 in cooperation with a driving motor (not shown) cause shaft 39 to rotate and feed a length of paper determined by the time interval between signals appearing on the clutch input line 373 and the brake input line 374. The "paper feed" signal on line 373 causes the clutch to be engaged thereby starting the paper-feed, and a subsequent "paper stop" signal on line 374 causes the brake to be engaged thereby stopping the paper-feed. The "paper feed" and "paper stop" signals are the mutually exclusive output signals of a flip-flop FF 36, Figure *5b* and therefore when one appears the other is suppressed, so that the clutch 37 and brake 38 can never be simultaneously engaged.

The paper feed commutator 399, which performs the function of stopping paper feed, consists of three discs, 395, 395′, 395″. Disc 395 has, in a typical instance, six equally spaced flat surfaces 396 around its circumference, each flat surface corresponding to one sixth of a revolution of shaft 39 which represents a single space paper-feed. Disc 395′ has three equally spaced flat surfaces and disc 395″ has two diametrically opposed flat surfaces, corresponding respectively to double space and triple space paper-feed. It will be understood that other disc arrangements could be used to provide different paper spacing combinations. Single, double, or triple space paper-feed is selected by jumpering energy source 393 to plug 398, 398′, 398″, thus respectively energizing light source 394, 394′, or 394″. Light sources 394, 394′, and 394″ are oriented to illuminate disc 395, 395′ and 395″ respectively. The illumination reflected from a disc passes through converging lens 391 and is focused on a photosensitive transducer 392 which converts the received illumination into an electrical signal. This signal appears on line 370 and stops the paper feed, as will subsequently be shown. Figure *5a* illustrates the condition for single space paper-feed, wherein energy source 393 is jumpered to plug 398 thereby energizing light source 394 which illuminates disc 395. As disc 395 rotates during paper-feed, one of the six flat surfaces 396 will assume the proper position to reflect light into photosensitive transducer 392, which will then generate a signal stopping the paper-feed. It is apparent that six such signals will be generated from disc 395 for each revolution of shaft 39, while three such signals would be generated from disc 395′ for double space paper-feed, and two such signals from disc 395″ for triple space paper-feed.

The program paper-loop system 386 generates control signals that are used in the fast-feed circuits.

The fast-feed circuits prevent the paper-feed commutator 399, previously described, from stopping the paper after a single, double, or triple space feed. The paper-loop may generate control signals that initiate or stop a fast-feed operation. For purposes of illustration, the program paper-loop system 386 is shown generating three fast-feed stop signals and one fast-feed start signal. The three stop signals are designated "channel 1," "channel 2," and "channel 3," and the start signal is designated "fast-feed 3." Channel 3 supplies the stop signal for a fast-feed operation initiated by the fast-feed 3 signal, both of these signals being generated by the paper-loop system. Channel 1 and channel 2 supply the stop signal for a fast-feed operation initiated by a fast-feed 1 or fast-feed 2 signal, these latter two signals, however, are not generated by the paper-loop system. A fast-feed 1 or fast-feed 2 signal, when it occurs, is initiated by the first character of an information blockette read from the magnetic tape during a "read in" cycle. This first character becomes identified as a fast-feed 1 or fast-feed 2 signal when it emerges from the nonprinting symbols decoder 49 (Figure 3), earlier described. Turning now to a closer inspection of the program paper-loop system 386 it is seen that an endless paper-loop 380 looped around shafts 382 and 39 revolves in synchronism with the paper-feed commutator and the paper-feed sprocket (not shown), as shaft 39 revolves. The paper-loop 380 is perforated with holes 381, which, together with hole-sensing brushes 383 generate the channels 1, 2, 3, and fast-feed 3 signals through a conventional contact type signal generator 384 whenever a brush senses a hole in the paper-loop. As shown, the holes 381 are disposed in discrete channels, or tracks, completely traversing the paper-loop 380, each channel being associated with a particular hole-sensing brush 383 and generating a particular fast-feed signal. It will be hereinafter recognized that although the program paper-loop system generates signals which stop a fast-feed operation, nevertheless, the precise position at which the paper being fed is stopped will be controlled by the paper-feed commutator 399. This condition is necessary to preserve the timing structure of the machine and to insure that uniform line spacing be maintained. The specific means by which this is accomplished will be subsequently described. The program paper-loop system 386 performs essentially two programming functions. Firstly, it removes the burden from the information source, such as a computer, of having to supply signals which both start and stop a fast-feed operation. It is only necessary for the source to initiate a fast-feed, the paper loop supplies the stop signal. Secondly, it can both initiate and stop a fast-feed operation in cases where the paper feeding requirement is imposed by conditions external to the information source. As an example, consider the case where a pre-printed form is being filled in, such as a tax-form or a billing form. Each form fed by the paper-feed is identical to the preceding and succeeding forms, and further, each form contains discrete locations for the entry of specific items of information. Generally, one form will be sufficient to accommodate all the entries for any given account, but occasionally an account may require more entries under a specific information item than there is space available. This, of course, requires that the succeeding form be used to accommodate the excess entries, or overflow, and these entries must be made at the proper place on the form. Suppose that the information source supplies more entries than can be accommodated by the particular location on the form. It is apparent that if no steps are taken, the remainder of the entries will be printed at the beginning of the next location, an incorrect position for such entries. Certainly, such a situation could be taken into account by programming appropriate signals into the information source. However, this is undesirable because it requires the information source to take into account the extent of a particular set of items. Any change in the format would require a re-programming of the information source. This is a needless complication of already complex equipment. This burden can be completely removed from the information source and transferred to the paper-feed system of the printer. The paper-loop system 386 in conjunction with the circuits of Figure *5b* represent a novel means of accomplishing such a result. Since the paper-loop 380 revolves in synchronism with the paper-feed sprocket (not shown), specific locations on the paper-loop correspond to specific positions on the form being fed by the paper-feed roller. If a hole is punched in the fast-feed 3 channel of the paper-loop corresponding to the last entry line of the particular form location, when an overflow condition occurs a fast-feed 3 signal will be generated which will initiate a fast-feed operation. This will cause the paper-feed roller to continuously feed the form until a fast-feed stop order occurs. This stop order is generated by a hole in the channel 3 channel of the paper-loop which is punched at a position corresponding to the form location proper to receive the overflow, which will be on the succeeding form. In addition, the program paper-loop supplies channel 1 and channel 2 signals which are stop orders for fast-feed operations initiated by the information source via the fast-feed 1 or fast-feed 2 signals. These latter two signals, when they occur, are as previously indicated the first character in an information blockette, and can be used to signify the beginning of a new information item on the above discussed form. Since the arrival time of an information blockette bears no fixed relationship to the position of the form, some indexing system must be used to insure that the information is printed at the proper location. This function is performed by the paper-loop channel 1 or channel 2 stop signal, as will now be shown. When all the entries to be made under a given item of a particular account have been entered, space may remain for additional entries which will, of course, not be forthcoming. The next blockette will initiate a fast-feed operation which must be terminated at the beginning of the next item location on the form. The termination of the fast-feed is provided by a hole in the channel 1 or channel 2 channel of the paper-loop, punched at a position corresponding to the proper location on the form. A channel 1 signal will stop a fast-feed 1 operation and a channel 2 signal will stop a fast-feed 2 operation. Therefore, it will be seen that although the initiation of a fast-feed 1 or fast-feed 2 operation is indeterminate with respect to the position of the form, the position of the form determines when the fast-feed operation will stop by virtue of the one-to-one correspondence of the form position to the paper-loop 380 position, thus providing the required indexing. The fast-feed 1 and fast-feed 2 signals occur at the beginning of a "read in" cycle, but should the fast-feed operation continue beyond the "read in" time, the printing cycle is inhibited until the feed operation has terminated. It is convenient to maintain a file of paper-loops that are punched to accommodate the formats of the various forms used. These paper-loops can be used repeatedly, thus simplifying the programming of the information source.

Having now described the conditions when the machine is initially started, and further, having described the operation of the paper-feed commutator and the program paper-loop system together with signals generated therefrom, we will turn to a detailed examination of the circuits of Figure *5b*. In order, we will consider the "normal feed" and "fast feed" operations, how they are each initiated and how they cooperate with other sectors of the machine to affect the over-all operation.

The "normal feed" operation is initiated at the end of a "print cycle" by a "read start" signal from the gate 275 which will be described in connection with Figure 9.

The "read start" signal passes through buffer 352 and sets the flip-flop 36 the output of which via line 373 causes the paper-drive clutch 37 to be engaged. This in turn causes the paper-feed commutator 399 (Fig. 5*a*) to rotate and ultimately generate a signal on line 370 in the manner previously explained. The signal on line 370 passes through gate 301 (Figure 5*b*) which is uninhibited in the absence of a fast-feed signal and restores the flip-flop 36, the restored output of which simultaneously takes three separate paths. First, the restored output of the flip-flop 36 via line 374 causes the paper-drive brake 38 to be engaged, thus stopping the paper-feed. Simultaneously, the clutch 37 is disengaged as hereinbefore explained. Second, the restored output of the flip-flop 36 passes through buffer 365 and inhibits gate 304, thereby preventing a fast-feed 3 operation from being initiated by the program paper-loop system. Third, the restored output of the flip-flop 36 is differentiated in differentiator 340 and triggers delay flop 320 through buffer 353. The trigger output of the delay flop 320 inhibits gate 302 for ten milliseconds in order to provide for electrical stabilization of the paper-drive clutch system before permitting a fast-feed signal, if one were now received, to set flip-flop 36 and re-engage the paper-drive clutch 37. The primary purpose of the delay flop 320 is, however, to allow a ten millisecond delay before starting a "print cycle." This is necessary to insure mechanical stabilization of the paper and thereby prevent misalignment of the print, which would occur if printing were done during this time. At the end of the ten milliseconds delay produced by the delay flop 320, the trigger output disappears and the delay output appears. This delayed output passes through differentiator 346 to the gate 303, which is uninhibited in the absence of a fast-feed signal. The output of the gate 303 sets a flip-flop 312, thereby generating the "end of paper feed" signal. This signal appears at gate 22 of Figure 4, and its presence is a pre-requisite to the initiation of a "print cycle." The function of this signal is more fully explained in connection with the description of Figure 4. With the generation of the "end of paper feed" signal the "normal feed" cycle is completed. Assuming that a normal "print cycle" follows, the code generator, shown in Figure 8, as subsequently described generates an "end of print cycle" signal at the termination of the printing operation. This signal passes through buffer 367 and restores the flip-flop 312, thus terminating the "end of paper feed" signal. A "read start" signal is generated by the print circuit gate 275, Figure 9, three milliseconds after the "end of print cycle" signal and the hereinabove described "normal feed" cycle is reinitiated.

The fast-feed operations are of two kinds, namely those initiated by a signal from the information source, such as a magnetic tape, and those initiated by the program paper-loop system 386. Operations of the first type are illustrated by the fast-feed 1 and fast-feed 2 circuits, while those of the second type are illustrated by the fast-feed 3 circuit. Both types are terminated by signals from the paper-loop. Although the fast-feed 1 or fast-feed 2 operation will always be initiated by the first character of an information blockette (in accordance with the embodiment described), the termination of the operation is controlled by channel 1 or channel 2 respectively of the paper-loop 380 which will generally be hole-punched at different places. It will be understood that additional fast-feed operations may be obtained by suitable modification of the paper-loop system and by duplication of the circuits of Figure 5*b* hereinafter described.

In order to insure that the routine set up on the paper-loop 380 will not interfere with the requirements established by the information source, a fast-feed order is established whereby a fast-feed 1 or fast-feed 2 operation will always take precedence over a fast-feed 3 operation. The manner in which this is accomplished will be described in connection with the fast-feed 1 operation described hereinafter.

The first SP1 signal (delayed sprocket pulse) obtained from delay line 105 of Figure 2*a* gates the fast-feed 1 or fast-feed 2 signal through the non-printing special symbols decoder 49 as previously described in connection with Figure 3. Since the fast-feed 1 or fast-feed 2 signal was the first character of an information blockette, the address line counter, also previously described in connection with Figure 2*b*, was in its "cleared" condition and had energized address line 0 just prior to the generation of the fast-feed 1 or fast-feed 2 signal. The address line 0 signal conditions the gates 305 and 306 so that the fast-feed 1 or fast-feed 2 signal subsequently arriving at its respective gate input will be permitted to pass through. For purposes of illustration, assume that a fast-feed 1 signal arrives at the input of gate 305. This signal will pass through gate 305 and set flip-flop FF 313.

It will also simultaneously pass to line 371 through buffers 355 and 369, and to restore the flip-flop 315 through buffer 357. If a fast-feed 3 signal had previously been generated by the paper-loop system 386, the fast-feed 3 signal would have passed through gate 304 and differentiator 343, and thus set flip-flop 315. The set output of flip-flop 315, however, would not have passed through gate 306 since neither the address line 1 nor the second delayed sprocket pulse SP1 have as yet been generated, these latter two signals being associated with the second character in the information blockette. When these signals do appear at gate 306 no fast-feed 3 operation, if set up, could be initiated because the fast-feed 1 signal has restored flip-flop 315. The restored output of flip-flop 315 passes through buffer 360 to line 372 and thence through differentiator 345 to the restore input of flip-flop 311, which is already in the restored condition. Simultaneous with the restoring of flip-flop 315 the fast-feed 1 signal on line 371 triggers delay flop 321 and initiates a 100 microsecond pulse from pulse stretcher 330. The 100 microsecond pulse passes through buffer 364 and inhibits gate 304, thus preventing any subsequent fast-feed 3 signal from again setting flip-flop 315. Delay flop 321 produces a delayed output 50 microseconds after being triggered by the fast-feed 1 signal on line 371. This delayed output passes through differentiator 344 setting flip-flop 311 and restoring flip-flop 312, if it had been set, through buffer 368. The set output from flip-flop 311 passes through buffer 366 to gate 304, maintaining the inhibition on gate 304 after the 100 microsecond pulse from pulse stretcher 330 disappears. Thus, it can be seen that a fast-feed 1 signal takes precedence over a fast-feed 3 signal by restoring flip-flop 315 prior to the opening of gate 306, and by inhibiting gate 304 thereby preventing any subsequent fast-feed 3 signal from again setting flip-flop 315. As has been shown, gate 304 is inhibited during the entire fast-feed 1 operation by the combined effects of pulse stretcher 330 and flip-flop 311. Pulse stretcher 330 is necesary to maintain the inhibition on gate 304 until the set output of flip-flop 311 appears, this output being delayed by delay flop 321. The delay introduced by delay flop 321 is necessary to insure that the fast-feed 1 signal on line 371 does not arrive at the set input of flip-flop 311 until after the restored output from flip-flop 315 has arrived at the restore input of flip-flop 311; the restored output of flip-flop 315 also having been generated by the fast-feed 1 signal.

The set output from flip-flop 311 in addition to inhibiting gate 304 inhibits gates 301 and 303, and sets flip-flop 36 through gate 302, differentiator 341, and buffer 351. The set output of flip-flop 36 causes the clutch 37 to be energized and the brake 38 to be de-energized to start paper feed. The inhibition on gate 301 prevents the signal generated by commutator 399, and appearing on line 370, from restoring flip-flop 36. Thus, paper continues to be fed until the channel 1 signal is generated by the program paper loop 380. This signal restores flip-flop 313. The restored output of flip-flop 313 is applied through buffer 358 and line 372 to the differentiator 345. The output of this latter element is in turn applied to the restore input of flip-flop 311 to remove the inhibition of gate 303 and of gate 301, which then passes the next commutator 399 signal appearing on line 370 to the restore input of flip-flop 36. This signal operating through flip-flop 36 then causes brake 38 to be energized and clutch 37 to be deenergized to stop paper feed. The "end paper feed" signal is then generated as previously described in connection with the normal feed operation.

If, instead of a fast-feed 1 operation, a fast-feed 2 operation had been initiated by a fast-feed 2 signal appearing at the input of gate 306, the fast-feed 2 signal would set the flip-flop 314, and also pass through buffers 356 and 369 to line 371. Thereafter, the fast-feed operation would continue in the same way as already described for the fast-feed 1 operation. However, the termination of the fast-feed 2 would be controlled by a channel 2 signal from the paper-loop. This signal would restore the flip-flop 314 and the restored output would pass through buffer 359 to line 372. The restored output on line 372 would restore the flip-flop 311 through differentiator 345, thus terminating the fast-feed operation as previously described.

The fast-feed 3 operation initiated by the paper-loop will now be described. The initiation of this operation will be described only to the point of setting the flip-flop 311, and the termination of the operation will be described only to the point of restoring the flip-flop 311 since the consequences of setting and restoring this flip-flop have already been thoroughly discussed in connection with the fast-feed 1 operation. Also, the preceding circuits have likewise been discussed in connection with the fast-feed 1 operation, and they will not be given further detailed attention. Assume now that the first character of an information blockette is not a fast-feed 1 or fast-feed 2 signal, so that address line 0 time comes and goes and no fast-feed signal appears at the input of gate 305 or 306 in response to the first delayed sprocket-pulse SP1, as described in connection with the non-printing symbols decoder hereinbefore referred to. However, the first delayed sprocket-pulse SP1 has stepped the address line counter, also hereinbefore referred to, and caused address line 1 to be energized. When now a fast-feed 3 signal from the paper-loop appears at gate 304, it will pass through gate 304 and differentiator 343, setting the flip-flop 315. The set output of the flip-flop 315 appears at the input of gate 306 which is not yet open, the gate 306 being only partly conditioned for signal transmission by the address line 1 signal. When the second delayed sprocket-pulse SP1 appears, gate 306 opens and the set output of the flip-flop 315 passes to line 371 through now-open gate 306 and buffer 361. The SP1 pulse now disappears and gate 306 again closes. The signal on line 371 passes to pulse-stretcher 330 and the trigger input of the delay flop 321. Pulse-stretcher 330 applies a 100 microsecond inhibition to gate 304 through buffer 364, as previously described in connection with the fast-feed 1 operation. After 50 microseconds, the delayed output of the delay flop 321 appears, passes through differentiator 344 and sets the flip-flop 311, thereby starting the fast-feed. The fast-feed 3 operation is terminated by a channel 3 signal from the paper-loop which passes through buffer 363 to restore the flip-flop 315. The restored output of the flip-flop 315 passes through buffer 360 to line 372 and thence through differentiator 345 to restore the flip-flop 311 and, thereby, terminating the fast-feed 3 operation.

When the machine has been set up for a multiline printing operation, which will be described hereinafter, a "multiline in progress" signal is generated during the multiline printing cycle. This signal is required to prevent an erroneous fast-feed 3 operation from occurring after the termination of the multiline operation. This erroneous operation could come about in the following way. Since paper is fed during the multiline operation and the paper-loop 380 is therefore moved, it is possible that a fast-feed 3 signal may be generated by the paper-loop system 386. This signal would pass through gate 304 and differentiator 343, setting flip-flop 315. However, during the multiline operation no magnetic tape is read and therefore the second delayed sprocket pulse SP1, and address line 1 signals are not generated, thereby preventing gate 306 from transmitting the set output signal of flip-flop 315 and preventing a fast-feed 3 operation from taking place. Flip-flop 315, however, would remain in its set condition. When the multiline operation terminates the tape is again read, if the first character in the blockette is a fast feed signal then flip-flop 315 will be restored in the manner already described in connection with the fast-feed 1 operation, and no problem arises. If, however, the first character in the blockette is not a fast feed signal, then flip-flop 315 will not be restored, and when the second delayed sprocket pulse SP1 and address line 1 signals subsequently condition gate 306 for signal transmission, the set output from flip-flop 315 will pass through gate 306 and initiate an erroneous fast-feed 3 operation. The trailing edge of the "multiline in progress" signal prevents this undesirable situation from arising. This signal passes through differentiator 342 and buffer 362 to the restore input of flip-flop 315, thus insuring that flip-flop 315 is restored when the multiline operation terminates.

Having described how the memory circuits are filled during a read-in cycle and having described how printing paper is moved concurrently with the read-in cycle, the operation and control of the printing hammers will now be considered. Before this is done, however, a description of the code generator as shown in Figure 8 will be given since this unit operates to control most of the printing circuits.

The majority of signals generated during the print operation (cycle) are derived either directly from the code generator or from the code generator acting in cooperation with another logical unit of this device. Functionally the code generator may be broadly divided into two classes: the first one being to provide a changing binary code, the instantaneous code being representative of the type character that is under the print hammers. The second function of the code generator is to provide (either directly or indirectly) all control signals necessary to operate the High Speed Printer during the print operation cycle. The description of how the code and control signals are generated will be dealt with here only in a general manner. However, the copending application of Eckert and Jacoby, Serial No. 514,630, filed June 10, 1955, which has been assigned to the assignee of this invention, describes in full detail a device which, when stimulated by a start operation signal, will generate a changing binary code and all the necessary control signals, properly timed, attributed to the code generator in this application.

Referring now to Figure 8, there is shown a code generator 202 responsive to an optically controlled indexing system, which includes an index pulse wheel 200, a clear wheel 201, light sources 203, and photocells 204 and 205. Index pulse wheel 200 and clear wheel 201 are mechanically ganged through shaft 24 to the typewheel 25. Shaft 24 is driven by a motor 26, thereby causing the typewheel 25, the index pulse wheel 200, and the clear wheel 201 to rotate synchronously.

The typewheel may be, but is not limited to, the one shown in copending U.S. application 486,206, supra. In the present specification, the typewheel 25 has 51 pairs or 102 longitudinal rows of characters equally spaced around its peripheral surface. Each pair of rows is devoted to a different character; thus there are 51 different characters that can be printed by the typewheel. Each pair of longitudinal rows, consisting of the same characters, is arranged so that the first row of a pair to be apposed to the print hammer is printed in the odd-numbered columns and the second row of a pair to be apposed to the print hammers is printed in the even-numbered columns. This arrangement, as explained in the Eckert and Masterson application, supra, avoids smudging on carbon copies.

The index pulse wheel 200 has 102 flat polished surfaces 207 on its periphery which correspond to the 102 rows of characters on the typewheel. Somewhat before a row of characters is apposed to the print hammers, a polished surface 207 on index pulse wheel 200 reflects light from source 203 to photocell 204, which then stimulates the code generator through line 210. During the print cycle, each time the code generator is stimulated in the aforementioned manner a detailed answer probe is generated at the outputs of gate 228 and print "*a*" pulse or print "*b*" pulse is alternately generated at the outputs of gates 231 or 232. Print "*a*" pulses control the printing mechanism for the characters to be printed in the odd-numbered columns, and print "*b*" pulses control the printing mechanism for the characters to be printed in the even-numbered columns. The detailed answer probe, which is generated 102 times each printing cycle, is used in conjunction with the comparator and will be explained in the section dealing with that subject matter. In addition, every other time the code generator is stimulated a new "*n*" position binary code is generated. In this particular case the code generator produces a six position binary coded output.

Basically the part of the code generator which produces the instantaneous code representative of the characters apposed to the print hammers may be a cascaded chain of six binary counters 226 connected to and arranged to gate in a binary manner a set of six gates 227. This chain of six cascaded binary counters 226 is stepped once for every two pulses generated by the index pulse wheel 200. The electrical circuit which provides the dividing action, i.e. steps the chain of binary counters 226 once for every two inputs, is a single stage binary counter 225. The step input of binary counter 225 is connected to line 210, and thus said binary counter 225 receives an input (herein called an index pulse) every time a polished surface 207 on the index pulse wheel 200 intercepts a beam of light from source 203, causing the photocell 204 to emit a signal pulse along line 210. However, as is well known in the art, a binary counter is a bistable device and therefore inherently capable of developing two distinct outputs, which may be arbitrarily called the "1" output and the "0" output. Further, it is known that a given output is produced once for every two inputs and that said outputs from a binary counter are mutually exclusive. Figure 8 shows that the "0" output of binary counter 225 is connected to the step input of the chain of binary counters 226, and thus it is obvious from the foregoing statements that for every two pulses generated by the index pulse wheel 200 (acting in concert with light source 203 and photocell 204) the chain of binary counters 226 is stepped once.

Motor 26 continuously drives shaft 24 so that the typewheel 25 and the two code-generator stimulus wheels 200 and 201 are rotating both during the read (fill memory) and print operation. Therefore, the code generator receives impulses from the index pulse wheel 200 during the entire operating cycle of the high speed printer.

At all times, the code combination produced by the code generator represents the characters on the typewheel then apposed to the print hammers. This is true even when the printing operation is not taking place, i.e. when the memory is being filled. However, the coded output from the code generator is conditioned for transfer only when a print signal is applied to an input terminal **202*a* of the code generator. This is brought about in the following manner. One output from each stage of the chain of the six binary counters 226** is connected through a respective line *a* to *f* to one input of each of six binary counter output gates shown collectively as binary counter output gates 227, while the output of gate 228 is applied in parallel to another input of all the six gates 227. Each of these gates 227 will selectively transmit to its associated output line the output from the gate 228 only when the gates have received a proper conditioning signal from the associated stage of the binary counter 226. That is, if the gates 227 are connected to the "1" output of the associated stages in the binary counter chain 226 then these gates 227 pass signals received from gate 228 only when the associated stage in the counter 226 is in the "1" state. The generation of output signals from gate 228 is in turn dependent upon the presence of a print signal on its input 230 and a signal pulse on its input 229 from the index pulse wheel. Inputs 229 and 230 of gate 228 are connected to photocell 204 through line 210 and to print signal terminal **202*a*, respectively. Since the generation of an output signal from gate 228 is necessary before the binary counter output gates 227 will transmit the outputs representative of the state of the chain of counters 226, and since the output signal from gate 228 will not be generated until both inputs 229 and 230 of gate 228 are energized by an index pulse and a print signal, respectively, it can be stated that the outputs of the chain of binary counters 226 will be transmitted only when a print signal is present at terminal 202*a***.

The output signal generated by gate 228 serves one other purpose, that being to perform the function of the detailed answer probe used in connection with the comparator. This signal is produced each time an index pulse is generated if the print signal is present at terminal **202*a***.

As was made apparent, the print signal is normally generated after the memory is filled and the paper has been moved to its next position. The signals which indicate that the paper has been moved (end of paper feed signal) and that the memory has been filled (end of read signal) are both applied to a start print cycle gate 22 (Figure 4 as described hereinabove) as permissive signals. If the start print signal gate 22 is not prevented from transmitting signals (due to reasons which have been heretofore explained), an output from this gate is produced when both aforementioned permissive signals are applied as inputs. This output, which is a sustained signal occurring during the print cycle, is called the start print cycle signal. Referring now to Figure 7, it is shown that the negatively-clipped differentiated output from the start print cycle gate 22 (i.e. the leading edge of the start print cycle signal) is differentiated and clipped and applied as a trigger to one shot multivibrator 250, which produces two outputs; wherein the first output appearing at terminal **250*a* is produced immediately and the second output appearing at terminal 250*b* is delayed. The first output from one shot multivibrator 250** is applied to the comparator shown in Figure 2*b* as the yes-no probe (YN), and is differentiated by differentiator 251 and applied to the input of delay flop 253. The delayed output of delay flop 253 is differentiated by differentiator 254 and applied to the printing circuits, as the fire check pulse (FC). Both the yes-no probe and the fire check pulse (FC) are non-sustained signals and are generated only once per printing cycle. The effect of the yes-no probe will be described, and the effect of the fire check will also hereinafter be discussed. The delayed or second output from one shot multivibrator 250 is differentiated by differentiator 240 and is applied to the set input of flip-flop 252. The set output of flip-flop 252, which is a sustained signal, is called the print signal and is applied to terminal **202*a*** of the code generator, Figure 8.

Thus at the start of a print cycle a print signal is generated by the circuit of Figure 7. The presence of the print signal functions as above mentioned to permit the coded output from the generator 202 to appear and also allows two control signals, print "*a*" pulse and print "*b*" pulse, to be generated by the code generator.

It will be observed from Figure 8 that the output of photoelectric cell 204 is connected to gate 233 through line 210 and delay means 245, which may be, for example, a delay flop or any suitable delay line. This gate 253 is also conditioned by the presence of a print signal at terminal 202*a*. Therefore, if the print signal is present, gate 233 will pass each delayed index pulse arriving at gate 233 from delay 245. The output of gate 233 is connected to one input 237 of gate 231 and to one input 234 of gate 232. Inputs 235 and 236, respectively, of gates 231 and 232 are connected to the "0" and "1" outputs of binary counter 225, respectively. As previously mentioned, the "0" and "1" outputs of binary counter 225 are generated alternately by the application of an index pulse through line 210 to the step of binary counter 225. Therefore, outputs from gates 231 and 232 are developed alternately, i.e. when binary counter 225 produces a "0" output, an index pulse is passed through gate 231, and when binary counter 225 produces a "1" output, an index pulse is passed through index gate 232. Effectively, the 102 index pulses generated by the index pulse wheel in each revolution are divided into two parts; 51 pulses appear at the output of gate 231 and are called print "*a*" pulses, and 51 pulses appear at the output of gate 232 and are called the print "*b*" pulses. Print "*a*" and "*b*" pulses control the operation of the printing circuits shown in Figure 9 and will be explained in conjunction therewith.

As mentioned in the previous paragraph, gate 233 transmits delayed index pulses which have been generated by index pulse wheel 200. Also it will be recalled that each index pulse (not delayed) permits a conditioning signal to be transmitted by gate 228 so that the six position coded output of the binary counter gates 227 may be transmitted to the comparator of Figure 2*b* for comparison with the code stored in the various memory locations. Thus it appears that the code produced by the code generator is transmitted to the comparator before the print "*a*" and print "*b*" pulses are used to control the operation of the printing circuit.

Beside controlling the printing mechanism, the number of print "*a*" and "*b*" pulses generated determine when the print operation ends and when the read operation begins. This is broadly accomplished in the following manner: The print pulse outputs (print "*a*" pulse and print "*b*" pulse) are connected to the step input of the binary counter 111 as shown in Figures 2*a* and 2*b*. The counter 111 of Figure 2 yields an output at its 102 address-line when 102 print pulses (*a* and *b*) have been generated; this 102 count taken from the 102 address-line is fed back into the code generator on input terminal 239 to allow one of the pulses generated by the index pulse wheel 200 to energize an element within the code generator which first produces an end of print signal and after a delay produces a read start and/or clear memory signal. This occurs in the following manner: the 102 count developed by the counter 111 in Figure 2*b* and appearing at terminal 239 in Fig. 8 is connected to one input 242 of gate 240. The other input 243 of gate 240 is connected to the output of gate 233, which passes every pulse from the index pulse wheel 200 (assuming a print signal is present). Since the output of gate 233 is connected to the input 243 of gate 240, the pulse generated by the index pulse wheel which passes gate 233 when the 102 count is generated will be transmitted through gate 240. The output of gate 240 is connected to the input of one shot multivibrator 241, which produces an end of print signal at output 241*a* when said one shot multivibrator 241 receives an input from gate 240 and produces a clear memory and/or read start signal at output 241*b* three milliseconds later. When 102 print "*a*" and "*b*" pulses have been counted, the typewheel has made one complete revolution and each of the 102 longitudinal rows of characters has been apposed to the print hammers.

In the copending application which describes the code generator there is shown as an integral part of the code generator a 102 counter. For economy and space saving considerations the seven stage binary counter 111 shown in Figure 2*b*, which serves as an address line selector during the read operation, is used as an 102 counter during the print operation.

The end (end print cycle) of print signal generated by multivibrator 241 is applied to flip-flop 312 of Figure 5*b* which in turn causes the removal of the end of paper feed conditioning signal on the start print cycle gate 22 (Figure 4), thereby removing the start print cycle output signal from gate 22 and consequently removing the print signal from terminal 202*a* of the code generator in the manner as will now be described. Referring again to Figure 7, it is shown that the positively-clipped differentiated output from the start print cycle gate 22 of Figure 4 (i.e. the trailing edge of the print cycle signal) is applied to the restore input of flip-flop 252 causing this flip-flop to change its output state from a set output to a restore output. As mentioned previously, the set output of flip-flop 252 was used as a conditioning signal (print signal) on terminal 202*a* for the code generator, and its removal prevents the code generator from transmitting coded outputs, or from generating control signals.

The code generator 202 is also stimulated by a clear pulse emanating from the clear wheel 201. The pulse emanating from the clear wheel 201 is used to synchronize the outputs of the code generator which represent type characters with the type characters on the typewheel apposed to the print hammers. This clear pulse is developed when the flat polished surface 209 on clear wheel 201 reflects a light beam from source 203 to photocell 205, which in turn stimulates the code generator through line 211. The clear wheel 201 has only one polished surface, and thus only one clear pulse is generated for every 102 index pulses. The polished surface 209 on clear wheel 201 is positioned so that a clear pulse is generated immediately after the character on the typewheel which is represented by the last usable coded output from the code generator is apposed to the print hammers. The pulse generated by the clear wheel is then used to jam binary counter 225 to its one output state and to clear the binary counters 226 of the code generator (in a manner disclosed in the code generator application supra) to a particular code output so that the next pulse from the index pulse wheel steps the binary counters of the code generator to an output representative of the characters on the typewheel then apposed to the print hammers. Each time a new character of the 51 characters present on the typewheel is apposed to the print hammers the code generator is stepped by a pulse from the index pulse wheel to produce a new output representative of the character then apposed to the print hammer.

Returning to Figure 2*b*, the association of the code generator to the comparators will now be described. Figure 2*b* indicates that there are 120 comparators connected to the memory in such a way that each individual address-line in the memory circuit 21 is provided with its own comparator circuit. For reasons of simplification, the drawing shows only three individual comparator units, namely comparator 0 for address-line 0, comparator 102 for address-line 102, and comparator 119 for address-line 119. The operation of the comparator circuits and its component elements is described in detail in the copending application of Eckert and Masterson, supra, and also in the copending application of Eckert and Reickord, Serial No. 514,629, filed June 10, 1955, now Patent No. 2,842,-663, assigned to the same assignee as the present application, and reference is made to all the details disclosed therein. The discussion of the comparator circuits and their operation will, therefore, be restricted in this application to those features which correlate their functions with the functions of other sections of the machine.

There is one comparator circuit for each address-line in the memory 21. The anode of every memory thyratron in any address-line has its own individual connection to the comparator circuit for that address-line. This is indicated in the drawing where, for example, the anodes of memory tubes I through VI in address-line 0 have their own individual connection to the comparator for address-line 0. Within the comparator circuit, the anode output line of every memory tube in the associated address-line is connected to that output line from the code generator described above which carries the code signals for the same position within a code combination as is assigned to the memory tube. The input flip-flops, the input gates and the memory thyratrons are shown in Figures 2*a* and 2*b* with specific Roman numerals to indicate their position in regard to the code combinations. For reasons of simplification, only three positions out of six assumed code positions have been illustrated in full, namely the code positions I, II and VI. For illustration purposes, to be consistent, only three out of six code signal output lines of the code generator are shown connected to the comparators, namely the ones which carry the signals for code positions I, II and VI. As a result of the interconnections between the memory tube output lines and the corresponding code generator output lines, the comparator circuits can compare the signals stored in their respective associated address-line with the signals delivered from the code generator.

The comparator circuits respond to two different kinds of probes, as described in the Eckert and Reickord application, supra. One of these two probes has been called the "yes or no" probe and is derived from Figure 7 as shown. The other one has been called the "detailed answer" probe and is derived from Figure 8 as shown. The "yes or no" probe occurs at the start of each print cycle and determines whether or not there is any information whatsoever in any specific location of the memory. As far as this kind of a probe is concerned, it is of no interest to recognize the specific code combination which may have been stored in that location. It suffices for the purpose of this examination to find out whether at least one of the six thyratrons in a given address-line is ignited, regardless of the position of that thyratron within any code combination. This "yes or no" probe occurs only once during every print cycle, and it occurs at its very beginning. It is brought about by the application of the "YN" signal which comes indirectly from the gate circuit 22 and is identical with the leading edge of the start print cycle signal emanating from that gate circuit. During the "yes or no" probe there is no code signal output from the code generator.

If the "yes or no" probe in any of the 120 comparator circuits results in the determination that there is some information stored in the corresponding memory location, the respective comparator circuit emits an output signal on its associated output line which as hereinafter described ignites the checking thyratron of that print hammer circuit which is controlled by the memory location in question. Details in regard of these checking tubes will be discussed hereinafter in connection with Figure 9.

Turning now to the "detailed answer" probe, DA, it goes without saying that during this probe the information stored in any given address-line is compared with the code combinations signalled by the code generator. The "detailed answer" probe is brought about by the application of the "DA" signal which is also produced by the code generator, Figure 8, and which reoccurs twice with every new code combination generated, once with the print *a* pulse and once with the print *b* pulse. If the code combination in any given address-line is identical with a code combination instantly generated by the code generator, an output signal results from that comparator where coincidence obtains. This means that if, for example, the code combination for the letter "A" is stored in address-line 0, an output signal will emanate from the comparator for address-line 0 when the code combination for "A" is signalled by the code generator. This output signal which is produced in response to the detailed answer probe will go to the print hammer actuating tube for that specific print hammer which is controlled by address-line 0. This signal arrives, as will be explained hereinafter, at this print hammer actuating tube somewhat before the time when the letter "A" on the print wheel opposes the print hammer. As a result, an "A" will be printed at that print location for which address-line 0 is responsible. It should be stressed in this connection that the code combination signals from the code generator appear simultaneously at all of the 120 comparator circuits. If, for example, the letter "A" has been stored in, let us say, address-lines 0, 51 and 87, the output signals from the comparator circuits for address-lines 0, 51 and 87 are sent to the print hammer actuating tubes for print locations 0, 51 and 87, respectively, and the letter "A" is printed in every one of these locations.

As long as the code combination stored in one specific address-line is in disagreement with any code combination signalled by the code generator, no output signal emanates from the comparator for that address-line.

The code generator having now been described, its control over the printing circuits of Fig. 9 will now be set forth. The printing circuits shown in Fig. 9 include a plurality of actuator units, one for each print hammer. Each actuator unit includes a check thyratron and a print thyratron tube arranged as shown. The actuators are controlled by the delayed differentiated output of delay flop 253 (Fig. 7), which transmits the fire check pulse (applied at terminal *g* of Fig. 9); the 120 outputs of the comparators which are applied at terminals 0, 1, 2, 3, etc.; the control signals (print "*a*" pulse, print "*b*" pulse, and the read start, clear memory pulse) from the code generator (Fig. 8) which are applied at terminals L, *f*, and *h*, respectively; and the Y–N probe applied at terminal *j*. The generation of the aforementioned signals which control the printing circuits has been previously discussed and therefore will not be dealt with in great detail here. However, there are two other signals, the check "*a*" pulse and the check "*b*" pulse, that also control the operation of the printing circuits. These signals are generated in the following manner: The print "*a*" pulse obtained from Fig. 8 is applied to differentiator **280*a* at terminal L. The output of this differentiator is applied to the input of delay flop 281*a*. The delayed output of said delay flop is differentiated by differentiator 282*a*** and is applied at terminal *k* as the check "*a*" pulse. A similar method is used to generate the check "*b*" pulse. Print "*b*" pulses obtained from Fig. 8 are applied at terminal *f* to differentiator **280*b* and then to the input of delay flop 281*b*; the delayed output of said delay flop is differentiated by differentiator 282*b*** and applied as the check "*b*" pulse at terminal *e*.

The output of the printing circuits controls which character on the print wheel 25 will be imprinted on the paper 70 and in conjunction with the code generator controls the transmission of the read start signal to terminal 460 of Fig. 4 and to the paper feed circuits of Fig. 5*b*.

It is within the purview of this section of the specification to describe how, in a general way, the printing circuits perform the aforementioned tasks. However, since the description of the printing circuits will be general in nature, it should be stated that a detailed explanation of its operation can be found in the copending application entitled "High Speed Printer," Serial No. 486,206, supra.

Figure 9 also shows the connection of the comparing units to the actuator and checking units. The output of the comparing unit associated with memory address-line 0 is fed in parallel to the first grids of the thyratrons in actuator unit 290. The output of the comparing unit associated with memory address-line 1 is fed to first grids of the thyratrons in actuator unit 291. In similar manner, each of the comparing units associated with memory address lines 2, etc., respectively, connect to the actuator units 292, etc. The actuator units 290, 291, 292, 293, etc. are all identical and consequently a description of one thereof will be sufficient.

Each actuator unit has a gaseous check tube and print tube of the tetrode type. These tubes are designated 600 and 601, respectively, in actuator unit 290, and require substantial positive potential on both grids in order to fire, and once they fire they remain ionized as long as there is sufficient anode potential to maintain them in an ionized condition. The first grids of these two thyratrons are energized by the output from its associated comparator unit. The second grid of the check thyratron 600, and all other check tubes, is controlled by two groups of pulses. It is first controlled by the "fire check" pulse FC (previously developed) which occurs shortly after the print cycle of the apparatus begins. Later in the print cycle the second grid of tube 600, and the second grid of alternate check tubes thereafter, is controlled by a periodically recurring check "*a*" pulse. A check "*b*" pulse is applied to the second grid of the intermediate check tubes. The second grid of the print thyratron 601, and the second grid of alternate print tubes thereafter is controlled through a condenser 602 by the print "*a*" pulse from the code generator which occurs repetitively as previously described. The second grid of the intermediate print tubes is controlled by print "*b*" pulses. The second grid of each print tube is also controlled by the cathode potential of the associated check thyratron. The output current of the print thyratron 601, for example, energizes the solenoid 603 which in turn causes the associated print hammer controlled by solenoid 603 to move toward the paper 70. This effects printing in the first row of type.

It is interesting at this point to see how the current for operating the solenoids, such as solenoid 603, is made available without placing too large a surge on the incoming power line. The alternating current power supply X–Y is fed to the D.C. power supply 605 which has an output of about 650 volts and charges condenser 606. This condenser 606 may be rather large and in the case of a machine having 120 peripheral rows of type as aforesaid, the capacity of this condenser would be approximately 2,000 microfarads. This same size of condenser could be used in event the number of type rows was reduced but it may even then be of a different size. Since this condenser is connected across the D.C. power supply 605 at all times, it is charged throughout the entire print cycle. It is, however, arranged to supply current to the printing condensers 607, 608, etc. only for a limited time as will now be explained. The read start or clear memory pulse CM (which is generated by the code generator Fig. 8 in the manner previously described) passes through short delay line 671 to thyratron 609 causing the latter to conduct. The charge stored in condenser 606 may now flow through resistors 610, 611, etc., rectifiers 612, 613, etc., to printing condensers 607, 608, etc. These condensers 607, 608, etc. each have a capacity of about one microfarad. After these condensers have been sufficiently charged, the thyratron 609 is cut off. This is done as follows. The YN pulse generated at terminal 250*a* (Figure 7) at the start of the print cycle is applied at terminal *j* (Figure 9) and thereby fires the thyratron 620. Firing thyratron 620 lowers the potential on its anode to practically ground potential. Since this anode is connected through condenser 621 to the anode of thyratron 609, and since there is an inductor 622 in series with the anode of the latter thyratron, the sharp drop in potential at the anode of thyratron 620 draws with it downwardly the potential of the anode of thyratron 609 and holds it at a low enough potential for a long enough time to cut off this thyratron. Thyratron 620 is extinguished by the ringing of inductor 622. Upon restoration of the normal anode potential of thyratron 609, it is noted that the same cannot again become conducting until another CM pulse arrives after the end of the print cycle. Hence, once the print cycle has started and to condensers 607, 608, etc. have been charged, it is impossible for them to be charged again until a CM pulse arrives from the code generator at the end of the print cycle.

In other words, the condenser 607, 608, etc. can only be charged once during the print cycle. If, during such a print cycle the print thyratron which is complementary to the associated condenser is fired, the charge of that condenser is dissipated through the associated solenoid. In the case of the first peripheral row to be printed, the charge on condenser 607 is dissipated through solenoid 603 when the print thyratron 601 becomes conducting. This causes the associated print hammer to contact the paper 70.

The check thyratrons typified by tube 600 may be of GE Type 5663 and the print thyratrons typified by tube 601 may be of RCA Type 2050. However, any other suitable tubes may be employed.

If it be assumed that the 0 address-line in the memory circuit has the letter A stored therein, the operation of the apparatus, in order to print that character, is as follows; as already explained, the condensers 607, 608, etc. have been charged before the print cycle takes place. The next event is that Y–N probe is produced and this probe does two things. First, it actuates thyratron 620 to cut off thyratron 609 and prevent further charging of the condenser 607; and secondly and simultaneously, it probes the comparators of Fig. 2*b*. If all six gas tubes in a particular memory address line (for example, address-line 0) are de-ionized at the time a Y–N probe is applied to the comparator associated with address-line 0, there will be no output from that comparator.

However, if any one or more of the six gas tubes in memory address-line 0 is ionized at the time of arrival of the Y–N probe, there will be a pulse output from the comparator unit associated with address line 0 applied to the print circuits, namely to actuator unit 290.

Since the Y–N probe is connected to all of the comparators, it follows that there will be a simultaneous output from those comparators corresponding to rows of gas tubes in the memory where one or more tubes are ionized. There will be no output from those comparators where none of the corresponding gas tubes in the memory were ionized.

Consider for purposes of examination that the Y–N probe produces an output, hereinafter called a surge, from the comparator associated with address-line 0. This surge continues for a substantial period of time, due to the time constants of the circuits involved, and before the termination of this surge there appears the fire check pulse FC (see Fig. 7), which passes through rectifier 641, wire 670, condenser 624 to the second grid of the thyratron 600. The aforesaid surge from the comparator associated with memory address-line 0 is fed to the first grid of thyratron 600. Hence, the two grids of this thyratron 600 are concurrently energized and current now flows from the source 625 through resistor 626 to the anode of the thyratron 600, thence through the cathode resistors 627, 652 and power supply 695 to ground. The thyratron 600 now becomes conducting and remains in that condition until its anode potential is lowered to a sufficient extent that the tube is extinguished. Before the thyratron 600 was ionized there was no current through resistor 627 and the second grid of thyratron 601 was held at substantially negative 100 volts due to battery 695, and hence was not in a condition to be fired. However, now that the check tube 600 has been fired, the potential at the cathode of the check tube, and therefore the potential of the second grid of the thyratron 601, is greatly increased (in a positive direction) and therefore the print thyratron 601 has been made ready to fire in event two things occur simultaneously. First, that its first grid receives appropriate energization; and secondly, that its second grid receives a further energization through condenser 602. In other words, the mere raising of the potential of the second grid of thyratron 601, as a result of the firing of thyratron 600, is not enough to enable thyratron 601 to fire even if the first grid thereof is appropriately energized.

The next event which occurs is that the typewheel approaches the printing position of the character A. As this position is approached, binary signals representative of the character A pass to the comparator and, assuming that the character A is stored in the first location of the memory, there is an additional surge produced in the output of the comparator in response to the application of the detailed answer probe as previously described. This additional surge from the comparator associated with address-line 0 energizes the first grids of both the check tube 600 and the print thyratron 601. During the continuance of this surge, another pulse appears from the code generator, on wire 630, designated "Print (*a*)"; the pulse flows through condenser 602 to the second grid of the thyratron 601. Hence, the printing thyratron 601 now has all three of the potentials thereon which are required in order to fire it, namely, the printing thyratron 601 has a potential on its first grid coming from the comparator associated with address-line 0, the printing thyratron 601 has appropriate bias on its second grid by virtue of the fact that the checking thyratron 600 is conducting and thus raising the potential of its cathode, and the printing thyratron 601 has a third potential on its second grid due to the pulse on wire 630. Hence, the thyratron 601 fires and causes flow of current from the condenser 607 through solenoid 603, thyratron 601 to ground. This flow of current through the solenoid 603 causes the associated printing hammer to strike the letter A on the typewheel. Throughout the remainder of the period of a single rotation of the typewheel, no other character is to be printed by the type row with which the printing thyratron 601 is associated. If another character were printed by that type row, that character would appear on top of the printed letter A, and such strike-over printing is not desired. Further characters cannot be printed during the remainder of the rotation of the typewheel since the condenser 607 has been discharged and cannot be recharged until the end of the print cycle when the clear memory pulse CM fires the thyratron 609. When thyratron 601 fires, the potential of its anode approaches ground with the result that the potential of the anode of thyratron 600 also is drawn, with respect to its cathode potential, far negative by the condenser 631 so that the thyratron 600 is deionized At the conclusion of the printing operation, condenser 607 is substantially discharged and, therefore, tube 601 extinguishes since there is no other source of energy.

If it be assumed that the second memory location, here labelled memory location 1, of the memory contains the letter E, it would be printed as follows: As in the case of the letter A, at the beginning of the print cycle the Y–N probe applied to the comparators would produce a surge from all of the comparators associated with memory locations in which information have been stored. It would therefore produce such a surge from the comparator associated with address-line 1. This output surge would overlap the fire check pulse FC coming from terminal *g*, and therefore the check thyratron 640 would be ionized since it would have the fire check pulse passing via rectifier 623 and condenser 642 to the second grid of this thyratron 640 and it would have the surge from the comparator associated with address-line 1 arriving at its first grid. Hence, the current would increase through resistor 644 and thus reduce the bias on the second grid of the print thyratron 645. Nothing further would happen toward the printing of this character until the typewheel rotated so far that character E approached printing position. When this occurs, the code produced by the code generator 202 would conform with the character stored in the second location of the memory in which event and in response to the application of the detailed answer probe to the comparator associated with address-line 1, there would be a coincidence pulse leaving the comparator associated with address-line 1 which would energize the first grid of the print thyratron 645. Since this comparison pulse is of very substantial duration, it will overlap the "Print (*b*)" pulse which appears on wire 646 and flows through condenser 647 to the second grid of the thyratron 645. Consequently, the thyratron 645 will be fired since it has all three potentials on its grids which are necessary for firing. Current will then flow from condenser 608 through printing solenoid 687 and thence through the thyratron 645.

It is noted that the printing pulses (*a*) and (*b*) are staggered, the same as the characters on the typewheel are staggered. That is, the "Print (*b*)" pulses are delayed in time with respect to the "Print (*a*)" pulses to allow the typewheel to rotate the angular distance between rows of characters before printing takes place. As further illustration of what was mentioned in the previous sentence, let it be assumed that there is stored in each of the first ten locations of the memory the letter D. As the typewheel approached and become ready to print the letter D, the first ten comparing units associated with memory address-lines 0 to 9 inclusive would produce an output surge, which would appear at the grids of ten print thyratrons. However, the print thyratrons for the first, third, fifth, seventh and ninth vertical columns would be fired first, since they are all connected to wire 630. After these thyratrons had fired, the typewheel would continue to rotate until a print *b* pulse appears on wire 646. The surges from the comparator would again be present at this time, since a separate comparison is made for each row of type on the typewheel, and would overlap the signal on wire 646. Then, the letter D would be printed in second, fourth, sixth, eighth and tenth type rows.

The function of the check thyratrons will now be described in more detail. The Y–N probe produces a surge from the comparators only when there is at least one gas tube in the associated memory location that is ignited. For example, if there are certain memory locations in which no binary signal is stored, there will be no output from the comparator associated with that memory address-line. In other words, in response to the Y–N probe there are outputs from the comparator associated with each address-line only when there is information stored in the complementary memory location. Hence, in response to the Y–N probe, there are surges from those comparators associated with memory address-lines containing binary signals other than 000000. These surges fire the check thyratrons (when the FC pulse is present) corresponding to the rows of the memory having binary signals other than 000000. As for those actuator elements 290, 291, 292, etc. which will be inactive so far as the printing is concerned, by reason of the fact that nothing is stored in the memory corresponding thereto, the check tube will not be ionized. For example, if the first word to be printed is AB followed by a space and then the word CD, it is noted that the Y–N probe would cause surges to be produced by the comparator associated with memory address-lines 0, 1, 3 and 4, but there would be no surge produced by the comparator associated with memory address-line 2. Hence, check tubes 600 and 640 would be energized but check tube 650 would not. Since the check tube 650 is not energized by the Y–N probe, no printing can occur in the third peripheral row even if at some later period in the print cycle a noise pulse should occur which would be impressed on the grids of the thyratrons 650 and 651. As soon as the letter A had been printed in the first peripheral row, the check tube 600 would be extinguished. As soon as the letter B had been printed in the second peripheral row, the check tube 640 would be extinguished. Likewise, after the printing of the letters C and D in the fifth and sixth peripheral rows, the check tubes for those rows would be extinguished. Hence, at the end of the printing cycle, all check tubes should be extinguished, since where printing occurred the check tubes were once on, but later turned off, and where there was no printing the check tube was never on. If any check tube remains on at the end of a printing cycle, it may be that an error has occurred. The "all-out detector" resistor 652 is intended to determine whether all check tubes are out at the end of a printing cycle. The all-out detector comprising common cathode resistor 652 is a simplified version of the all-out detector shown in copending application #486,206 supra. If at the end of a printing cycle any one of the check tubes is still on, it will draw current through its cathode resistor, 627, 644, etc. This current, through the common cathode resistor, 652, will continue to flow until the next clear memory pulse CM arrives from terminal 241*b* of Fig. 8. When there is a flow of current through a cathode resistor 652 simultaneously with the appearance of a clear memory pulse CM, from Fig. 8, gate 274 will open and pass a signal herein called print error signal at its output 274*a*, and gate 275 will be inhibited so as not to pass a read start clear memory signal to its output terminal 275*a*. If common cathode resistor 652 is not passing current when the read start CM signal is applied to gates 274 and 275 then gate 274 will not transmit any output (that is, a print error signal is not transmitted) and gate 275 will transmit a read start clear memory signal to its output terminal 275*a*.

Either of two circumstances can cause a check thyratron to remain energized at the end of a printing cycle. Assuming the previous condition where A and B are printed in the first and second peripheral rows respectively and nothing is printed in the third row, if it be also assumed that the apparatus operates in the normal way and the letter A is printed but that following the printing of the letter A an unwanted noise signal appears from the comparator associated with memory address-line zero, the apparatus would operate as follows. This noise pulse cannot energize the print thyratron directly without previously energizing the check thyratron 600, since it is necessary for the check thyratron to be turned on before the second grid of the print thyratron has proper bias for firing. The noise signal cannot energize the check thyratron until another check a pulse is transmitted over wire 670 to the second grid of thyratron 600. When such a pulse arrives on wire 670, it, together with the noise signal, will again turn on the check thyratron 600, but it cannot turn on the print thyratron 601 because it has already fired and discharged its associated condenser 607. That condenser cannot be recharged until the next CM pulse arrives at thyratron 609, so the print thyratron 601 remains off and the check thyratron 600 remains on. Therefore, at the end of the print cycle the check thyratron 600 is on and draws a current through the all-out detector resistor 652 and causes an error signal to be generated.

The mode of operation described in the preceding paragraph would be essentially the same in event a character was to be printed which is located in the typewheel near the end of the print cycle. For example, if the letter E was to be printed in the first location and the noise pulse occurred early in the print cycle, the noise pulse would cause another letter, for example A, B or C, to be printed, and when the typewheel reached the letter E, another surge would appear in the output of the comparator for memory address-line zero which, together with the check a pulse on wire 670, would turn on the check tube 600 and the latter would remain on to operate the all-out detector. Another function of the check tube is to give an indication in event a noise signal appears on one of the channels where no printing is to take place. For example, assume that the letters A and B were to be printed in the first two rows of type, but nothing was to be printed in the third row. In this situation, the check tube 650 would not be energized in response to the Y-N probe. Hence, it would remain de-energized until the unwanted noise signal arrived. In a conventional circuit, such an unwanted noise signal might energize the print thyratron and thus print a character in this third row, but this is impossible in view of the operation of the system.

The print thyratron 651 does not have sufficient potential on its second grid to perform a printing operation until the check thyratron 650 is first energized, but the check thyratron 650 cannot be energized ahead of the print thyratron 651 if the printing cycle has progressed beyond the appearance of the fire check pulse FC. This follows from the fact that the triggering pulses on the second grids of the printing thyratrons precede in time the triggering pulses on the second grids of the check thyratrons, due to the delay action of the delay flops 281*a* and 281*b*. Hence, the only thing that the noise pulse can do upon its arrival is to place a potential on the grid of the check thyratron 650 and if this potential persists until a signal appears on wire 670 from the code generator, the check tube 650 will fire and will remain fired until the end of the print cycle, at which time it will put a permissive signal on gate 274 and an inhibitory signal on gate 275. In order to insure that the gates 274 and 275 are concurrently energized by the signal from the all-out detector resistor 652, and the clear memory signal, before the clear memory signal re-ignites the thyratron 609, a very short delay line 671 may be placed in series with the grid of the thyratron 609.

From the foregoing, it will be apparent that if, for any reason, one of the check tubes is not extinguished, the read start signal is suppressed from the output terminal 275*a* of gate 275 and at the same time an error signal is generated at the output terminal 274*a* of gate 274. The outputs of these two gates are applied to the tape drive control circuits of Fig. 4. That is, the absence of the read start at terminal 460 (Fig. 4) precludes any further information to be read into the memory. Simultaneously, the print error output of gate 274 is applied to the stop flip-flop 471 which then applies an inhibit signal to the gate 22 to stop further printing operation, thus indicating that an error has occurred.

From the preceding discussion it was apparent that in regular printing operations the contents of the memory (one blockette or 120 sets of binary digits) may be printed on a single line. By the circuits and means now to be described the contents of the memory can be divided and printed out on as many as six lines by using the multiline symbol appearing at the beginning of a blockette of information.

Multiline printing is accomplished through the use of a conventional ring counter 800 and the various plugboards and relays shown in Fig. 6 together with the multiline starting and stopping gate circuitry generally designated 801 in Fig. 4. Reference is now made to these two figures. Whenever a multiline code combination appears on the tape, the special symbols decoder 49, Fig. 3, gates the sprocket pulse SP1 appearing at terminal 404 through to the multiline output line 439 of the decoder. This sprocket pulse appearing on the multiline output line is applied to the multiline start and stop circuits generally designated 801 of Fig. 4. In particular, the multiline sprocket pulse is applied to a delay flop DF 440 which operates in this circuit as a pulse stretcher providing an undelayed output pulse of typically 20 milliseconds duration. The leading edge of this pulse is differentiated by differentiator 441 and applied through a buffer B to the set input 443 of flip-flop 442, and also to the step multiline output 447. As flip-flop 442 is set in response to the multiline signal appearing on line 439, it applies an inhibition signal to gate 461 which prevents subsequently received read-start signals arriving at terminal 460 from reaching the tape drive control flip-flop 15. However, since it is apparent that the tape must be in motion to generate the multiline signal it is apparent that the first read start signal arriving at terminal 460 passes through the gate 461 to the tape drive control flip-flop 15 before the inhibition is applied to gate 461 from the flip-flop 442. Once the tape has started to move the entire blockette of information is read out and used to fill the memory in the manner described hereinabove. At the end of the reading cycle, flip-flop 15 is restored under control of the address line 119 of the address line selector as described, and a sustained permissor signal is applied to the gate 22 from the restore output of flip-flop 15. At this time or shortly thereafter a sustained permissor signal from the end of paper feed flip-flop 312, Fig. 5*b*, is also applied to gate 22. These two signals operating in the absence of an inhibition from the stop flip-flop 471 start a print cycle as previously described. At the end of the print cycle, the read-start output from gate 275 of Fig. 9, generates as described a read-start signal which is applied to line 460. This signal is blocked from the tape drive flip-flop 15 by gate 461 in response to the inhibition thereon due to multiline flip-flop 442. Instead of reinstituting a new read operation this read start signal is applied, through a gate 449 which now has a permissor signal applied thereto by the set output of the multiline flip-flop 442, to a delay flop 450. This delay flop 450, as delay flops 440, operates as a 20 millisecond pulse stretcher. The leading edge output of delay flop 450 is differentiated by differentiator 451 and applied through buffer B to the step multiline output 447. The diverted read start signal and the initial multiline signal are applied through line 447 to the step input of the ring counter 800 of Fig. 6. These signals step the counter 800 one step for each signal. This action continues until the number of read-start signals is sufficient to cause the ring counter 800 to complete a cycle or return to its zero state. At this time, the multilining process is at an end, and an end of multiline signal derived from the zero state of the ring counter is applied through line 445 and differentiator 446 of Fig. 4 to the restore input of the multiline flip-flop 442. This signal restores the flip-flop 442 and, thus, removes the inhibition from gate 461 and at the same time blocks gate 449, thereby stopping the diversion of subsequent read-start pulses to the step multiline line 447 and permitting delivery of these read-start pulses to the tape drive control flip-flop 15. This signal (end of multiline) is also shunted around flip-flop 442, as shown, and used as the read-start signal for the next blockette of information.

For reasons soon to become apparent with respect to the time required to close the relays of Fig. 6, the stretched outputs of delay flops 440 and 450 (Fig. 4) are buffed together through buffers B and B and applied through the line labelled "multiline time out" to the inhibitory terminal of gate 22 to delay the generation of the start print cycle leading edge until the relays of Fig. 6 have had a chance to operate.

Turning now to Fig. 6, the interconnection of the printing actuator circuits and the memory location comparators through the multiline relays and plugboards is shown. As illustrated, a first plugboard 802 containing 120 jacks, one for each memory location, is connected in a one to one correspondence with the 120 memory locations through the corresponding 120 comparator circuits shown as a single block 835. A second plugboard 803 containing 130 internally connected pairs of jacks is associated with the first plugboard. The second plugboard 803 is arranged so that by means of jumpers 804 any one of the 120 jacks on the first board 802 may be connected to any one or more pairs of the 130 jacks on the board 803. The 130 pairs of jacks are then separately connected through the contacts of eleven 12-pole relays 805 which are operated in unison from the zero position of the multiline counter 800 as later described, to 130 print actuator circuits in the manner generally indicated. Thus, even though the memory may have only 120 locations, the type wheel can be provided with 130 peripheral rows of type, each row having associated therewith a separate print hammer and actuator. Hence, by means of the jumpers 804, the code stored at any memory location can be connected to any one or more printing actuating circuits. This permits the information at one location to be printed, duplicated, or triplicated.

As mentioned, the connection from plugboard 803 to the various printing actuator circuits is normally made through the contacts of the single line relays 805. Actuation of these relays 805 is controlled by the zero state of the ring counter 800. In the case of a multilining operation, a step input on line 447 from the multilining circuits, Fig. 4, steps counter 800 from its zero state to break the aforedescribed single line relay connections and to institute a multilining connection which will now be described.

For multiline operation, a third plugboard 806 containing 180 pairs of internally connected jacks is provided. Any one or more pairs of these jacks may be connected by jumpers 807 to any one of the 130 pairs of jacks on board 803. In Fig. 6, a one to one correspondence in these jumper connections is illustrated. The 180 pairs of jacks on the third board 806 are connected in groups of twelve each through fifteen 12-pole relays 808 to 180 pairs of internally connected jacks on a fourth board 809. This board 809 also contains 130 output jacks connected to the 130 respective input lines of the 130 print actuation circuits in the manner indicated. The 130 output jacks can in turn be connected as indicated by connectors 810 and 811 to any one or more pairs of the 180 input jacks on board 809 in the general manner indicated.

The ring counter 800 is shown as a six stage ring with which is associated an interconnecting plugboard 812 which can be used to alter this ring 800 from six stages to any lesser number of stages. This is accomplished by connecting the output of each stage through a jumper 813 to the input of the next stage. Then, if it is desired to terminate the ring, for example, at four stages, as shown, the output of the fourth stage is connected by jumper 814 to the input of the zero stage.

Each output from the ring counter 800 in addition to going to the interconnecting plugboard 812 also connects to a corresponding jack on a multiline relay plugboard 815. This plugboard 815 has 15 pairs of output jacks, each pair connected to a corresponding relay coil of the fifteen 12-pole relays 808 interconnecting boards 806 and 809. By means of jumpers, such as jumper 816, any one of the stages in the ring 800 may be used to actuate one or more of the fifteen 12-pole relays 808.

In the multiline operation, the multiline symbol inaugurating the operation will, as mentioned above, ordinarily be in the first digit position of the blockette unless there is a fast feed symbol, in which case the fast feed will be first and the multiline symbol will be second. Each blockette to be multilined must have a separate symbol since the printer will return to single line operation automatically. Thus, if consecutive blockettes are to be multilined, a new multiline symbol is placed at the beginning of each blockette.

The multilining operation may be divided into three classes: (*a*) selecting the number of lines over which a blockette is to be printed, (*b*) selecting the memory positions which are to be printed on each line, and (*c*) selecting the location on each line for each character.

To select the number of lines over which the blockette is to be printed requires only that the jumper 814 on the multiline plugboard 812 be set accordingly. That is, if the blockette is to be printed over four lines the jumper 814 is connected as shown to make the ring counter 800 a four stage ring.

To select the memory locations to be printed on each line requires a proper choice of the connection of jumpers 807 connecting plugboards 803 and 806 and jumpers 810 and 816 on plugboards 809 and 815. The material to be printed out on each line is selected by connecting the memory locations on plugboard 802 or 803 to the appropriate contacts of those 12-pole relays which have been chosen to be energized for each line. The first step in this connection would be to select the 12-pole relays required to print each line. For simplicity, the relays preferably should be chosen sequentially. Thus if 40 characters are to be printed on the first line, 48 characters on the second line, 6 characters on the third line and 10 characters on the fourth line in a four line format; the first four 12-pole relays would be arranged to be energized by the first stage of the counter 800 (leaving 8 poles unused), the next four relays would be connected to be energized by the second stage of the counter 800, the next relay would be connected to be energized from the output of the third stage of the counter and finally the next two relays would be connected to be energized by the fourth stage of the counter.

The ring counter 800 has a manual start line 830 which is connected to the main control board of the machine together with all the other manual start lines so that, when the machine is initially started, a start pulse is sent into the ring counter 800 to set the counter to its zero state thereby enabling normal single line operation. Upon receipt of the first multiline symbol recorded on the magnetic tape, the multiline start-stop circuits 801 of Fig. 4 send a stepping pulse to the ring counter 800 on line 447 shifting the counter 800 from its zero position to its number 1 position. This shift breaks the single line connection by deenergizing the single relays 805 and energizes the one or more multiline relays connected to the number 1 position on plugboard 815. The first line of the multiline format is then printed and a read start signal is generated to actuate the circuits 801 (Fig. 4), which in turn shifts the counter 800 to its second position. Following this, the second line of the multiline format is printed. At the conclusion of the printing of the second line, another read start signal is generated to institute the printing of the third line in the multiline format, and so on, until the ring counter 800 is returned to zero and normal single line printing is resumed.

It has been stated hereinabove, in connection with the discussion of Figure 3, that one of the signals which may set the prevent read-in flip flop 401 is the suppress zero signal from gate 406. This section of the specification will explain how the zero suppress circuits operate.

The zero suppress circuits are used whenever it is desirable to delete any decimal zeros to the left of the most significant decimal digit in any numerical portion of a blockette. It is the purpose of these circuits to search for zeros in prespecified portions of the blockette (fields) until either a non-zero digit arrives or until the prespecified end of the field is reached. Any zeros detected under these conditions are not permitted to enter the memory. This is accomplished through the operation of the prevent read-in flip flop 401, as explained hereinabove, which, when set, puts an inhibition on gate 114 (Figure 2*a*) so that the set output of delay flop 106 (Figure 2*a*) cannot pass through that gate.

It has been described hereinabove that all code combinations stored in the input flip flops of Figure 2*a* are not only sent to the input gates G2I through G2VI, but are also sent to the nonprinting special symbols decoder 49. The code combination representative of a command order appears as a pulse signal in the output of the decoder 49 in response to the application of the sprocket pulse SP1 to terminal 404. Whenever the code combination for decimal zero is present in the decoder, it permits the application of a pulse as a zero signal to the gates 406 and 407, whereby this pulse acts as a permissor on gate 406 and as an inhibition on gate 407. This means that, if a zero signal is present, the correlated sprocket pulse SP1 applied in parallel to these gates from terminal 408 may pass through gate 406, provided that gate 406 is also alerted by the set output from zero field flip-flop 423. In such case, and only in such case, the sprocket pulse SP1 will pass through gate 406 to set the prevent read-in flip-flop 401.

It will now be explained how and when the zero field flip-flop 423 is set and restored, respectively. Figure 3 shows a plugboard 410 and a plugboard 411. The plugboard 410 has 120 input jacks, each connected to a corresponding address line 0 to 119 inclusive in the address line selector decoder 112 in Figure 2*b*. It should be remembered that the 120 output lines from the address line selector decoder correspond to the 120 character positions in the memory. The signal output of the address line selector decoder alerts the specific address line which, at any given time, is to receive the next character to be read into the memory. The same signal output can, therefore, be used to predetermine those character positions in the memory into which any zeros, if present, are not to be read in.

Plugboard 410 has two groups of 18 output jacks each, of which only five each are shown in the drawing. The right hand side group of 18 output jacks is used for the determination of which address line or address lines a zero suppress field or zero suppress fields should start. This is done by selectively connecting one or more of the 120 input jacks to one or more of the 18 right hand side output jacks. Similarly, the group of 18 output jacks on the left hand side is used to determine with which adress line or address lines a zero suppress field or zero suppress fields are to end. This again is done by selectively connecting one or more of the 120 input jacks to one or more of the 18 left hand side output jacks. It follows from the foregoing that the zero suppress field start signals are emanating from the right hand side, and that the zero suppress field stop signals are emanating from the left hand side of the plugboard 410.

Plugboard 411 has 18 pairs of input jacks on the start side and 18 pairs of input jacks on the stop side, of which again only five pairs are shown on either side. Within each pair of input jacks on the start side of plugboard 411 one jack is permanently connected to a corresponding output jack on the start side of plugboard 410. The other jack within each pair of input jacks on the start side of plugboard 411 may be selectively connected either to output jack 415 or to output jack 416 on the start side of plugboard 411. Which one of the two output jacks of plugboard 411 is to be used depends upon the fact whether the deletion of zeros is desired during single-line operations or during multiline operations. The output from output jack 415 is provided for multiline operations while the output from output jack 416 is provided for single-line operations. If it is desired to start the same zero suppress field during both kinds of operations, a Y patchcord connection from one input jack of plugboard 411 may be applied to both jacks 415 and 416. If more than one zero field is desired within the same blockette, the pairs of input jacks required on plugboard 411 must be tied together, and one single connection from one of these connected pairs of input jacks to the selected output jack 415 or 416 must be made.

Similar connections exist or are to be made between the stop side output jacks of plugboard 410 and the stop side input jacks of plugboard 411 as well as between the input jacks of plugboard 411 and the two output jacks 415*a* and 416*a* of plugboard 411. The output jack 415*a* is to be used to end the deletion of zeros during multiline operations while the output from jack 416*a* is to be used to end the deletion of zeros during single-line operations. If it is desired to end zero fields at the same place during both kinds of operations, a Y patchcord connection may be used to energize output jacks 415*a* and 416*a* by a signal from the same address-line. If more than one zero field is to be started within one blockette, the pairs of input jacks required on the stop side of plugboard 411 must be tied together and one single connection from one of the connected pairs of jacks must be made to the output jack 415*a* or 416*a*, as the case may be.

Turning now to the start side again, the output from jack 415 alerts gate 418, and the output from jack 416 alerts gate 419. These two gates are the start zero field gates. It ought to be noted that gate 418 needs, in addition to the permissive signal from jack 415, another permissive signal which is the multiline in process signal from flip flop 442 of Figure 4. The output from jack 416 puts a permissive signal on gate 419. This gate will, however, open only in the absence of a multiline in process signal. It is evident, therefore, that gate 418 operates only during multiline operations while gate 419 operates only during single-line operations. It may be stated, in this connection, that there is a similar arrangement on the stop side, as far as the end zero field gates 421 and 422 are concerned. Gate 421 operates during multiline operations and gate 422 operates during single-line operations.

If gate 418 is open during multiline operations or if gate 419 is open during single-line operations, the correlated sprocket pulse SP can pass through one or the other gate as the case may be. After passing the gate, the sprocket pulse goes through a buffer circuit B and enters into the set input terminal 424 of zero field flip-flop 423, thereby setting this flip-flop.

As long as zero field flip-flop 423 is set, all incoming zeros will be suppressed. The set output of the flip-flop 423 alerts gate 406 at the beginning of the zero field. Each subsequent zero signal from the decoder 49 adds the other permissive signal which is needed to open gate 406. Whenever gate 406 is open, the correlated sprocket pulse SP1, which comes from the terminal 408, can pass through gate 406 and enter the set input terminal 402 of the prevent read-in flip-flop 401. The character transferred signal obtained from the circuit shown in Fig. 2*a* is applied to the restore input R of the flip-flop 401 to restore this flip-flop after each code combination has been sensed by the pick-up heads 10A, as shown in Fig. 2*a*. With each following zero signal from decoder 49, another sprocket pulse SP1 passes through gate 406 and sets again the prevent read-in flip-flop 401.

This operation keeps repeating itself until either the arrival of a non-zero character or until the arrival of a signal from either one of the end zero field gates 421 and 422. In the case of the arrival of a non-zero character from the magnetic tape, there will be no zero signal from the decoder 49. As a result, gate 406 closes, thereby preventing the passage of a sprocket pulse SP1 through the gate 406. When the gate 406 is closed, no zero suppress signals can enter the set input terminal of prevent read-in flip-flop 401. At the same time, the inhibition of gate 407 by the zero signal is removed. The sprocket pulse SP1 can pass, therefore, through gate 407 and through a buffer circuit to enter as a not zero signal to the restore input terminal 425 of the zero field flip-flop 423. This signal restores the flip-flop 423, thereby removing the formerly existing permissive signal to gate 406.

The same restore effect on zero field flip-flop 423 is obtained at the predetermined end of any zero field when the sprocket pulse SP2 passes either through gate 421 or through gate 422, as the case may be, and through a buffer circuit to enter the restore input terminal 425 of flip-flop 423.

The suppress-zero sequence may be divided into four stages: the first stage would be the setup of a zero field which determines the time when the search for zeros begins. The second stage would be the one in which zeros are found and suppressed. The third stage would be the one in which the circuits stop searching for zeros because the first non-zero character has arrived. The fourth stage would be the one in which the circuits stop searching for zeros because the predetermined end of a zero field has been reached.

The three sprocket pulses SP, SP1 and SP2, the origin of which was explained hereinabove in connection with Figure 2, initiate the above-mentioned four stages. The first stage, namely the beginning of the search for zeros has to start, of course, before the beginning of the three other stages. Accordingly, it is the sprocket pulse SP, which arrives before the sprocket pulses SP1 and SP2, which initiates the first stage. By using the sprocket pulse SP1 for the actual suppressing of zeros, the time interval of five microseconds between the sprocket pulse SP and the sprocket pulse SP1 is provided, which gives the input flip-flops of Figure 2 and the zero field flip-flop 423 sufficient time to stabilize.

It goes without saying that the third stage takes precedence over the fourth stage. The sprocket pulse SP1 performs both the operation of suppressing a zero within a selected field (second stage) and of prematurely ending the suppressing of zeros as soon as a non-zero character arrives (third stage).

Turning now to the fourth stage which is brought about by the predetermined end of a zero field, the end zero field signal always occurs after the last character position within that predetermined field has been searched for the presence of a zero. The signal which is used as the end zero field signal is the sprocket pulse SP2 which occurs two and one half microseconds after the sprocket pulse SP1 has passed either through gate 406 or through gate 407 as the case may be. The end of a zero field signal cannot occur, therefore, before the sprocket pulse SP1 has finished its search for a zero or for a non-zero character.

What is claimed is:

1. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type, the combination comprising, a memory circuit having a plurality of distinct locations therein, each of said memory locations being associated with at least one print hammer, signal supply means including a distributor for successively feeding into each location of the memory circuit a coded signal representative of the type character to be imprinted by the type row associated with that memory location, means responsive to the completion of a cycle of operation of the distributor to arrest the operation of said signal supply means, means responsive to the arrestment of the signal supply means to inaugurate a printing cycle, said last named means including a code generator responsive to the arrestment of said signal supply means to produce coded signals characteristically identifying the type characters on the typewheel instantaneously under the print hammers, means actuating the print hammers associated with the memory locations in the memory circuit which have coded information stored therein corresponding to that being generated by the code generator, and means responsive to the completion of a cycle of coded signals generated by the code generator to reinstitute to the operation of the signal supply means.

2. The combination as claimed in claim 1 and further including circuit means responsive to the completion of a cycle of coded signals generated by the code generator to clear the memory circuit.

3. The combination as claimed in claim 1 in which the means for actuating the print hammers includes a comparison circuit for comparing the code being generated by the code generator with the code stored in each location of the memory circuit.

4. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type, the combination comprising, a memory circuit having a plurality of distinct locations therein, interconnecting means for interconnecting each of said memory locations with at least one print hammer, signal supply means including a distributor for successively feeding into each location of the memory circuit a coded signal representative of the type character to be imprinted by the type row associated with that memory location, means cyclically operating said interconnecting means to change the interconnections between the various memory locations and the print hammers, means responsive to the completion to a cycle of operation of the distributor to arrest the operation of said signal supply means, means responsive to the arrestment of the signal supply means to inaugurate a printing cycle, said last named means including a code generator responsive to the arrestment of said signal supply means to produce coded signals characteristically identifying the type characters on the typewheel instantaneously under the print hammers, means actuating the print hammers associated with the memory locations in the memory circuit which have coded information stored therein corresponding to that being generated by the code generator, and means responsive to the completion of a cycle of coded signals generated by the code generator to reinstitute the operation of the signal supply means.

5. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type, the combination comprising, a memory circuit having substantially as many distinct locations therein as there are print hammers, each of said memory locations being associated with at least one print hammer, signal supply means including a distributor for successively feeding into each location of the memory circuit a coded signal representative of the type character to be imprinted by the type row associated with that memory location, means responsive to the completion of a cycle of operation of the distributor to arrest the operation of said signal supply means, a paper feed mechanism operable during the interval in which the memory is being filled with coded information to advance the print paper under the print hammers, means generating an end of paper feed signal whenever the print paper has moved a predetermined distance, means responsive to the arrestment of the signal supply means and to the end of paper feed signal to inaugurate a printing cycle, said last named means including a code generator responsive to the arrestment of said signal supply means to produce coded signals characteristically identifying the type characters on the typewheel instantaneously under the print hammers, means actuating the print hammers associated with the memory locations in the memory circuit which have coded information stored therein corresponding to that being generated by the code generator, and means responsive to the completion of a cycle of coded signals generated by the code generator to reinstitute the operation of the signal supply means.

6. The combination as claimed in claim 5 which further includes circuit means responsive to the completion of a cycle of coded signals generated by the code generator to clear the memory circuit and to actuate said paper feed mechanism.

7. In an electronic high speed printer system including a continuously rotating typewheel having a plurality of identical peripheral rows of type characters with the corresponding type characters in successive rows arranged in approximately longitudinal alignment on the wheel, and further including a separate print hammer associated with each of the peripheral rows of type, the combination comprising, a memory circuit having a plurality of distinct locations therein, each of said memory locations being associated with at least one print hammer, signal supply means including a distributor for successively feeding into each location of the memory circuit a coded signal representative of the type character to be imprinted by the type row associated with that memory location, means responsive to the completion of a cycle of operation of the distributor to arrest the operation of said signal supply means, means responsive to the arrestment of the signal supply means to inaugurate a printing cycle, and means responsive to the completion of a print cycle to reinstitute the operation of the signal supply means.

8. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type, the combination comprising, a memory circuit having a plurality of distinct locations therein, each of said memory locations being associated with at least one print hammer, signal supply means including a distributor for successively feeding into each location of the memory circuit a coded signal representative of the type character to be imprinted by the type row associated with that memory location, means responsive to the completion of a cycle of operation of the distributor to arrest the operation of said signal supply means, means responsive to the arrestment of the signal supply means to inaugurate a printing cycle, said last named means including a code generator responsive to the arrestment of said signal supply means to produce coded signals characteristically identifying the type characters on the typewheel instantaneously under the print hammers, means actuating the print hammers associated with the memory locations in the memory circuit which have coded information stored therein corresponding to that being generated by the code generator.

9. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type, the combination comprising, a memory circuit having a plurality of distinct locations therein, interconnecting means for interconnecting each of said memory locations with at least one print hammer, signal supply means including a distributor for successively feeding into each location of the memory circuit a coded signal representative of the type character to be imprinted by the type row associated with that memory location, means cyclically operating said interconnecting means to change the interconnections between the various memory locations and the print hammers, means responsive to the completion of a cycle of operation of the distributor to arrest the operation of said signal supply means, means responsive to the arrestment of the signal supply means to inaugurate a printing cycle, said last named means including a code generator responsive to the arrestment of said signal supply means to produce coded signals characteristically identifying the type characters on the typewheel instantaneously under the print hammers, and means actuating the print hammers associated with the memory locations in the memory circuit which have coded information stored therein corresponding to that being generated by the code generator.

10. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type; the combination comprising, a memory circuit having a plurality of distinct locations therein, interconnecting means for interconnecting each of said memory locations with at least one print hammer, a magnetic recording medium on which there is recorded in code each type character to be printed on one horizontal line of type, a reproducing system associated with the recording medium for sequentially deriving the coded signals recorded on said recording medium, a transport mechanism for moving the recording medium past the reproducing system, a distributor for feeding each successively reproduced coded signal derived from the recording medium into a different location in the memory circuit, means responsive to the completion of a cycle of operation by the distributor to arrest the movement of the recording medium, means responsive to the arrestment of the recording medium to inaugurate a printing cycle, said last named means including a code generator responsive to the arrestment of said recording medium to produce coded signals characteristically identifying the type characters on the typewheel instantaneously under the print hammers, means comparing the coded signals generated by said code generator with those stored in each location of the memory circuit, and means actuating the print hammers associated with the memory locations in the memory circuit which have coded information stored therein corresponding to that being generated by the code generator.

11. In an electronic high speed printer system including a continuously rotating typewheel having a plurality of identical peripheral rows of type characters with the corresponding type characters in successive rows arranged in approximate longitudinal alignment on the wheel, and further including a separate print hammer associated with each of the peripheral rows of type, the combination comprising, a memory circuit having substantially as many distinct locations therein as there are print hammers, each of said memory locations being associated with at least one print hammer, signal supply means including a distributor for successively feeding into each location of the memory circuit a coded signal representative of the type character to be imprinted by the type row associated with that memory location, means responsive to the completion of a cycle of operation of the distributor to arrest the operation of said signal supply means, a paper feed mechanism operable during the interval in which the memory is being filled with coded information to advance the print paper under the print hammers, means generating an end of paper feed signal whenever the print paper has moved a predetermined distance, means responsive to the arrestment of the signal supply means and to the end of paper feed signal to inaugurate a printing cycle, said last named means including a code generator responsive to the arrestment of said signal supply means to produce coded signals characteristically identifying the type characters on the typewheel instantaneously under the print hammers, and means actuating the print hammers associated with the memory locations in the memory circuit which have coded information stored therein corresponding to that being generated by the code generator.

12. In an electronic high speed printer system including a continuously rotating typewheel having a plurality of identical peripheral rows of type, and further including a plurality of print hammers each associated with a different peripheral row of type, the combination comprising, a memory circuit having a plurality of distinct locations therein, means interconnecting each of said memory locations with at least one print hammer, means filling said memory circuit with coded signals representative of type characters to be imprinted by the peripheral type row associated with the different memory locations, a code generator synchronously operable with the rotation of the typewheel to produce coded signals representative of the type characters instantaneously under the print hammers, means for suppressing the output of said code generator until the memory circuit has been filled with coded information, and means actuating the print hammers associated with the different memory locations in the memory circuit when the coded signal generated by said code generator corresponds to that stored in the individual memory locations.

13. The combination as claimed in claim 12 wherein there is further included means for reinstituting the suppression of the output from the code generator at the end of a complete cycle of non-suppressed coded outputs therefrom.

14. The combination as claimed in claim 12 wherein there is further included means for periodically refilling the memory circuit with new information.

15. The combination as claimed in claim 14 wherein there is further included means for moving printing paper past the print hammers during the interval that the memory circuit is being refilled.

16. The combination as claimed in claim 14 which further includes means cyclically operating said interconnecting means to change the interconnections between the various memory locations and print hammers.

17. In an electronic high speed printer system including a continuously rotating typewheel having a plurality of identical peripheral rows of type, and further including a plurality of print hammers each associated with a different peripheral row of type, the combination comprising, a memory circuit having a plurality of distinct locations therein, means interconnecting each of said memory locations with at least one print hammer, signal supply means including a distributor for successively feeding into each location of the memory circuit a coded signal representative of the type characters to be imprinted by a peripheral type row associated with that memory location, a code generator synchronously operable with the rotation of the typewheel to produce coded signals representative of the type characters instantaneously under the print hammers, and means actuating the print hammers associated with the different memory locations in the memory circuit when the coded signal generated by said code generator corresponds to that stored in the individual memory locations.

18. The combination as claimed in claim 17 which further includes means operative to arrest the operation of said signal supply means when the distributor has completed a cycle of operation.

19. The combination as claimed in claim 18 wherein there is further included means for suppressing the output of said code generator during the interval in which coded information is being fed to said memory location.

20. The combination as claimed in claim 17 wherein there is included means for moving printing paper past the print hammers in the interval during which the memory circuit is being filled.

21. The combination as claimed in claim 17 which includes means operative in response to predetermined codes supplied to the signal supply means for inaugurating the movement of paper past the print hammers in the interval during which the memory circuit is being filled.

22. The combination as claimed in claim 17 which includes means operative in response to predetermined codes supplied by said signal supply means to change the interconnections between the various memory locations and print hammers.

23. In an electronic high speed printer of the rotating typewheel class, the combination comprising a memory circuit having a predetermined number of locations, signal supply means for cyclically filling said memory with coded signals representative of the information to be printed, said signal supply means providing a signal upon the filling of the last one of said locations, means responsive to said signal for inaugurating a printing cycle, and means for moving printing paper during the interval said signal supply means is operative to fill said memory circuit.

24. In an electronic high speed printer, the combination comprising a memory circuit, signal supply means for cyclically filling said memory with coded signals representative of information to be printed, means responsive to said signal supply means for inaugurating a printing cycle upon the filling of said memory, and means for moving printing paper during the interval said signal supply means is operative to fill said memory circuit, said paper moving means being rendered operative in response to predetermined codes supplied by said signal supply means.

25. In an electronic high speed printer of the rotating typewheel class, the combination comprising a memory circuit having a predetermined number of locations, signal supply means for cyclically filling said memory circuit with coded signals representative of the information to be printed, said signal supply means providing a signal upon the filling of the last one of said locations, means responsive to said signal for inaugurating a printing cycle, means responsive to the completion of the printing cycle to reinstitute operation by the signal supply means, and means operative during the interval in which the signal supply means is operative to advance printing paper.

26. In an electronic high speed printer, the combination comprising a memory circuit, signal supply means for cyclically filling said memory with coded signals representative of information to be printed, means responsive to said signal supply means for inaugurating a printing cycle upon the filling of said memory, means responsive to the completion of said printing cycle to reinstitute operation by said signal supply means, and means operative during the interval in which the signal supply means is operative to advance printing paper, said last named means being rendered operative in response to predetermined codes supplied by the signal supply means.

27. In an electronic high speed printer of the rotating typewheel class, the combination comprising a memory circuit having a predetermined number of locations, signal supply means for cyclically filling said memory circuit with coded signals representative of the information to be printed, said signal supply means providing a memory filled signal upon the filling of the last one of said locations, means responsive to said signal for inaugurating a printing cycle, means for generating an end-of-print signal upon completion of a printing cycle, and means responsive to said end-of-print signal for reinstituting operation by the signal supply means.

28. In an electronic high speed printer of the rotating typewheel class, the combination comprising a memory circuit, a coded signal supply source, means for cyclically applying the signals derived from said supply source to said memory, means for preventing predetermined codes supplied from said supply source from entering said memory circuit, and means responsive to the completion of a cycle of operation of said first named means to inaugurate a printing cycle.

29. The combination as set forth in claim 28 in which said means for preventing predetermined codes from entering the memory circuit is rendered operative during preselected intervals in the cycle of said first named means.

30. In an electronic high speed printer of the rotating typewheel class, the combination comprising a memory circuit, signal supply means for filling said memory circuit with coded signals representative of the information to be printed, means responsive to the completion of the filling of the memory circuit to inaugurate a printing cycle, means responsive to the completion of the printing cycle to reinstitute operation by the signal supply means, and means operative during the interval in which the signal supply means is operative to advance printing paper, and in which said last named means includes a circuit responsive to predetermined codes for initiating movement of the printing paper and further includes a control system coordinated with the movement of the printing paper to stop the advance of printing paper at predetermined locations.

31. In an electronic high speed printer of the rotating typewheel class, the combination comprising a memory circuit, signal supply means for filling said memory circuit with coded signals representative of the information to be printed, means responsive to the completion of the filling of the memory circuit to inaugurate a printing cycle, means responsive to the completion of the printing cycle to reinstitute operation by the signal supply means, and means operative during the interval in which the signal supply means is operative to advance printing paper, and in which said last named means includes a paper advance control system coordinated with the movement of the printing paper to start and stop the advance of printing paper in a predetermined manner.

32. A high speed automatic printing machine for converting information received as electrical signals into printed characters, comprising a reading unit and a printing unit; said reading unit comprising a memory for storing electrical signals in storage sections corresponding to a particular printing position within one printing line, address line selector circuits including a counter, and paper feed control circuits; said printing unit comprising a feed mechanism for paper to be printed, printing control circuits, a continuously rotating typewheel fitted with type corresponding to every printable character for every printing position within one printing line, and a separate printing hammer opposite to said typewheel at each said printing position actuable by the joint control of said printing control circuits and signals derived from the corresponding memory section when the character on said typewheel opposite said hammer corresponds to the character stored in that corresponding memory section; said machine operating in a two-phase cycle, a reading phase and a printing phase; said reading phase including substantially simultaneous operations of filling said memory and of advancing said paper into a new printing position; said printing phase including the printing operation; the shifting from said reading phase to said printing phase being determined by the coincidence of a signal from said address line selector circuits of said reading unit and a signal caused by the mechanical motion of said paper feed mechanism of said printing unit; the shifting from said printing phase to said reading phase being determined by the coincidence of a signal caused by the mechanical motion of said typewheel mechanism of said printing unit and a signal from said address line selector circuits of said reading unit; wherein electrical and mechanical operations both within said reading phase and said printing phase and for the transition from one phase to the other are synchronized.

33. The machine as claimed in claim 32, said reading unit further comprising a fast paper feed program loop and a device for starting and stopping fast paper feed; said fast paper feed device including a bistable device and a gate, said bistable device adapted to be set by a "fast paper feed start" electrical signal or by a signal from said program loop, the output from said bistable device, when set, being adapted to inhibit said gate, said gate when inhibited being prevented from passing a signal to stop said paper feed; said bistable device being adapted to be reset by a "fast paper feed stop" signal from said loop wherein said inhibiting signal is removed from said gate; the output of said gate being coupled to said paper feed control circuits to stop the feeding of said paper.

References Cited in the file of this patent

UNITED STATES PATENTS

| | | |
|---|---|---|
| 2,013,533 | Buhler | Sept. 3, 1935 |
| 2,036,016 | Buhler | Mar. 31, 1936 |
| 2,481,112 | Hanley | Sept. 6, 1949 |
| 2,482,242 | Brustman | Sept. 20, 1949 |
| 2,566,944 | Last | Sept. 4, 1951 |
| 2,580,192 | Potter | Dec. 25, 1951 |
| 2,638,542 | Fleming | May 12, 1953 |
| 2,686,470 | Gore | Aug. 17, 1954 |
| 2,692,551 | Potter | Oct. 26, 1954 |
| 2,776,618 | Hartley | Jan. 8, 1957 |
| 2,800,073 | Block | July 23, 1957 |
| 2,805,620 | Rosen | Sept. 10, 1957 |

UNITED STATES PATENT OFFICE

CERTIFICATE OF CORRECTION

Patent No. 2,915,966 December 8, 1959

Marvin Jacoby

It is hereby certified that error appears in the printed specification of the above numbered patent requiring correction and that the said Letters Patent should read as corrected below.

Column 2, line 70, after "code", second occurrence, insert -- the --; column 7, line 66, for "other" read -- others --; column 10, line 7, strike out "the delay flop DF113 causing a much lower voltage as," and insert instead -- delay flop 113. When the memory is to be cleared after --; column 13, line 70, for "end paper feed" read -- "end paper feed" --; column 30, line 32, for "become" read -- became --; column 40, line 12, for "approximately" read -- approximate --.

Signed and sealed this 25th day of October 1960.

(SEAL)
Attest:

KARL H. AXLINE
Attesting Officer

ROBERT C. WATSON
Commissioner of Patents